United States Patent
Li et al.

(10) Patent No.: US 11,622,403 B2
(45) Date of Patent: Apr. 4, 2023

(54) DATA SENDING METHOD, APPARATUS, AND SYSTEM

(71) Applicant: HUAWEI TECHNOLOGIES CO., LTD., Shenzhen (CN)

(72) Inventors: Guanchen Li, Shanghai (CN); Wenjie Peng, Shanghai (CN); Liwei Qiu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 118 days.

(21) Appl. No.: 17/134,359

(22) Filed: Dec. 26, 2020

(65) Prior Publication Data
US 2021/0120613 A1    Apr. 22, 2021

Related U.S. Application Data

(63) Continuation of application No. PCT/CN2018/092944, filed on Jun. 26, 2018.

(51) Int. Cl.
*H04W 76/15* (2018.01)
*H04L 45/74* (2022.01)

(52) U.S. Cl.
CPC ............. *H04W 76/15* (2018.02); *H04L 45/74* (2013.01)

(58) Field of Classification Search
CPC .... H04W 76/15; H04W 36/0069; H04L 45/74
See application file for complete search history.

(56) References Cited

U.S. PATENT DOCUMENTS

| 11,184,808 B2 * | 11/2021 | Youn | H04W 36/14 |
| 2013/0058308 A1 | 3/2013 | Jaiswal et al. | |
| 2015/0257146 A1 | 9/2015 | Xu et al. | |
| 2018/0035339 A1 * | 2/2018 | Mitsui | H04W 72/04 |
| 2018/0049214 A1 * | 2/2018 | Kubota | H04W 36/04 |
| 2021/0014765 A1 * | 1/2021 | Shan | H04W 36/14 |
| 2021/0321474 A1 * | 10/2021 | Xu | H04W 36/38 |

(Continued)

FOREIGN PATENT DOCUMENTS

| CN | 104902580 A | 9/2015 |
| CN | 105848222 A | 8/2016 |
| WO | 2016114623 A1 | 7/2016 |

OTHER PUBLICATIONS

European Search Report for Application No. 18924225.8 dated May 25, 2021, 15 pages.

(Continued)

*Primary Examiner* — Habte Mered

(57) ABSTRACT

Embodiments of this application provide a data sending method, apparatus, and system, and relate to the communications field, so that an SN change in dual connectivity does not affect performance of a network in which an MN is located. The data sending method specifically includes: determining, by a source node device, whether direct data forwarding is supported between the source node device and a destination node device; and sending, by the source node device, a first message including a first indication to a first node device, where the first indication is used to indicate whether the direct data forwarding is supported between the source node device and the destination node device. This application is used for data sending.

18 Claims, 13 Drawing Sheets

(56) References Cited

U.S. PATENT DOCUMENTS

2022/0038960 A1* 2/2022 Xu .................... H04W 36/0055

OTHER PUBLICATIONS

3GPP TS 37.340 V2.0.0 (Dec. 2017);3rd Generation Partnership Project;Technical Specification Group Radio Access Network;Evolved Universal Terrestrial Radio Access (E-UTRA) and NR;Multi-connectivity;Stage 2(Release 15);Total 51 Pages.
3GPP TS 37.340 V15.2.0 (Jun. 2018);3rd Generation Partnership Project;Technical Specification Group Radio Access Network;Evolved Universal Terrestrial Radio Access (E-UTRA) and NR;Multi-connectivity;Stage 2(Release 15);Total 55 Pages.
PCT/ISA/220 for PCT/CN2018/092944 dated Jun. 26, 2018.

* cited by examiner

DATA SENDING METHOD, APPARATUS, AND SYSTEM

CROSS-REFERENCE TO RELATED APPLICATIONS

This application is a continuation of International Patent Application No. PCT/CN2018/092944, filed on Jun. 26, 2018, the disclosure of which is hereby incorporated by reference in its entirety.

TECHNICAL FIELD

This application relates to the communications field, and in particular, to a data sending method, apparatus, and system.

BACKGROUND

Currently, in wireless communications, a dual connectivity technology, in which a terminal device uses both a 4th generation mobile communications technology (the 4th Generation mobile communication technology, 4G) and a 5th generation mobile communication technology (the 5th-Generation mobile communication technology, 5G), is proposed. The dual connectivity technology is an evolved terrestrial radio access network (Evolved Universal Mobile Telecommunications System Terrestrial Radio Access Network, E-UTRAN) and new radio (New Radio, NR) dual connectivity (E-UTRAN-NR Dual Connectivity, EN-DC) technology. In the EN-DC technology, the terminal device obtains data from both a long term evolution (Long Term Evolution, LTE) network and a 5G NR network, that is, uses radio resources of a plurality of base stations. The plurality of base stations are classified into a master station and a secondary station, which are usually referred to as a master node (Master Node, MN) and a secondary node (Secondary Node, SN).

A concept of "split bearer" is introduced into dual connectivity technology. A packet data convergence protocol (Packet Data Convergence Protocol, PDCP) entity of the data is terminated on an NR side. In other words, the data is split to a plurality of base stations at a PDCP layer on the NR side. When a device on the NR side changes but a device on an LTE side does not change, an SN change (change) procedure is performed on the NR side. In the procedure, residual data of a source 5G base station (Source gNB) before the change on the NR side needs to be transferred to a target 5G base station (Target gNB) after the change on the NR side.

A protocol procedure of an NR change is defined in the 3rd generation partnership project (3rd Generation Partnership Project, 3GPP) 37.340 protocol. In the protocol procedure, a data flow is defined to be forwarded by the source gNB to the target gNB via an evolved NodeB (Evolved Node, eNB) in a 4G network.

Coverage of NR is smaller than that of LTE. Therefore, the SN change procedure frequently occurs on the NR side. Consequently, a large quantity of residual data generated due to the frequent SN changes is forwarded, and performance of the LTE network degrades.

SUMMARY

Embodiments of this application provide a data sending method, apparatus, and system, so that an SN change in dual connectivity does not affect performance of a network in which an MN is located.

To achieve the foregoing objective, the following technical solutions are used in the embodiments of this application.

According to a first aspect, a data sending method is provided. The data sending method includes: A source node device determines whether direct data forwarding is supported between the source node device and a destination node device. The source node device sends a first message including a first indication to a first node device, where the first indication is used to indicate whether the direct data forwarding is supported between the source node device and the destination node device. The source node device receives a response message of the first message from the first node device, where the response message of the first message includes an address for the direct data forwarding between the source node device and the destination node device, or the response message of the first message includes an address for indirect data forwarding between the source node device and the destination node device. The source node device directly sends data to the destination node device based on the address for the direct data forwarding, or the source node device forwards data to the destination node device based on the address for the indirect data forwarding.

According to the data sending method provided in this application, the source node device sends the first indication in the first message, to indicate, to the first node device, that the source node device determines whether the data can be sent between the source node device and the destination node device in a direct data forwarding manner. In this way, if the direct data forwarding is performed between the source node device and the destination node device, a data packet in an SN change initiated by the source node device this time does not need to be forwarded via the first node device, and performance of a network in which the first node device is located is not affected.

Optionally, the first indication may be a mandatory information element, and whether the direct data forwarding is supported between the source node device and the destination node device is explicitly indicated based on different values of the first indication.

For example, when the first indication is the mandatory information element, the value of the first indication may be true, used to indicate that the direct data forwarding is supported between the source node device and the destination node device, or the value of the first indication may be false, used to indicate that the direct data forwarding is not supported between the source node device and the destination node device. Certainly, when the first indication is the mandatory information element, a specific value of the first indication may be configured based on an actual requirement. This is not specifically limited in this application.

Optionally, the first indication may be an optional information element, and whether the direct data forwarding is supported between the source node device and the destination node device is indicated when a value of the information element is carried and not carried. The value of the information element may be defined as supporting the direct data forwarding. When the optional information element is carried, it indicates that the direct data forwarding is supported between the source node device and the destination node device; when the optional information element is not carried, it indicates that the direct data forwarding is not supported between the source node device and the destination node device. Alternatively, the value of the information element may be defined as not supporting the direct data forwarding. When the optional information element is not carried, it indicates that the direct data forwarding is supported between the source node device and the destination node device; when the optional information element is carried, it indicates that the direct data forwarding is not supported between the source node device and the destination node device.

For example, when the first indication is the optional information element, the value of the information element may be defined as true. If the value of the information element is carried, it indicates that the direct data forwarding is supported between the source node device and the destination node device. If the value of the information element is not carried, it indicates that the direct data forwarding is not supported between the source node device and the destination node device.

For example, when the first indication is the optional information element, the value of the information element may be defined as false. If the value of the information element is carried, it indicates that the direct data forwarding is not supported between the source node device and the destination node device. If the value of the information element is not carried, it indicates that the direct data forwarding is supported between the source node device and the destination node device.

It should be noted that content of a specific value of the information element of the first indication and a definition of the content may be configured based on an actual requirement. This is not specifically limited in this embodiment of this application.

With reference to the first aspect, in a possible implementation, the source node device determines that the direct data forwarding is supported between the source node device and the destination node device, the response message of the first message includes the address for the direct data forwarding between the source node device and the destination node device, and the source node device directly sends the data to the destination node device based on the address for the direct data forwarding.

With reference to the first aspect, in a possible implementation, the source node device determines that the direct data forwarding is not supported between the source node device and the destination node device, the response message of the first message includes the address for the indirect data forwarding between the source node device and the destination node device, and the source node device forwards the data to the destination node device based on the address for the indirect data forwarding.

With reference to the first aspect, in a possible implementation, the source node device determines that the direct data forwarding is supported between the source node device and the destination node device, the response message of the first message includes the address for the indirect data forwarding between the source node device and the destination node device, and the source node device forwards the data to the destination node device based on the address for the indirect data forwarding.

With reference to any one of the first aspect or the foregoing possible implementations, in another possible implementation, the first message may include a node change request message.

With reference to any one of the first aspect or the foregoing possible implementations, the source node device may include an SN device, and the first node device may include an MN device.

According to a second aspect, a data sending method is provided. The data sending method includes: A first node device receives a first message from a source node device, where the first message includes a first indication and an identifier of a destination node device, and the first indication is used to indicate whether direct data forwarding is supported between the source node device and the destination node device. The first node device sends a response message of the first message to the source node device, where the response message of the first message includes an address for the direct data forwarding between the source node device and the destination node device, or the response message of the first message includes an address for indirect data forwarding between the source node device and the destination node device.

According to the data sending method provided in this application, the first node device receives the first indication sent by the source node device in the first message, and feeds back, to the source node device, the address for the direct data forwarding or the address for the indirect data forwarding based on the first indication. In this way, if the direct data forwarding is performed between the source node device and the destination node device, a data packet in an SN change initiated by the source node device this time does not need to be forwarded via the first node device, and performance of a network in which the first node device is located is not affected.

It should be noted that the first indication has been described in detail in the first aspect, and details are not described herein again.

With reference to the second aspect, in a possible implementation, the first message may include a node change request message.

With reference to any one of the second aspect or the foregoing possible implementation, in another possible implementation, the first message may alternatively include the identifier of the destination node device. The data sending method provided in this application may further include: The first node device obtains, based on the identifier of the destination node device, the address for the direct data forwarding between the source node device and the destination node device.

With reference to any one of the second aspect or the foregoing possible implementations, in another possible implementation, that the first node device obtains, based on the identifier of the destination node device, the address for the direct data forwarding between the source node device and the destination node device may be specifically implemented as follows: The first node device sends a second message to the destination node device based on the identifier of the destination node device, where the second message includes an identifier of the source node device. The first node device receives a response message of the second message from the destination node device, where the response message of the second message includes the address for the direct data forwarding between the source node device and the destination node device.

With reference to any one of the second aspect or the foregoing possible implementations, the second message may include a node addition request message.

With reference to any one of the second aspect or the foregoing possible implementations, the source node device may include an SN device, and the first node device may include an MN device.

It should be noted that the data sending methods provided in the first aspect and the second aspect are a same method described from perspectives of the source node device and the first node device respectively. For specific implementation of the data sending methods, reference may be made to each other, and details are not described herein again.

According to a third aspect, a data sending method is provided. The data sending method includes: A first node device sends a first message to a source node device, where the first message includes an address for direct data forwarding between the source node device and a destination node device, and/or an address for indirect data forwarding between the source node device and the destination node device.

According to the data sending method provided in this application, the first node device sends the address for the direct data forwarding and/or the address for the indirect data forwarding to the source node device by using the first message, so that the source node device selects to perform the direct data forwarding or the indirect data forwarding. In this way, if the direct data forwarding is performed between the source node device and the destination node device, an SN change does not need to be forwarded via the first node device, and performance of a network in which the first node device is located is not affected.

Specifically, content included in the first message may be configured by the first node device based on an actual requirement.

In a possible implementation, the first node device may determine that the direct data forwarding is supported between the source node device and the destination node device, and the first message includes the address for the direct data forwarding between the source node device and the destination node device. Alternatively, the first node device may determine that the direct data forwarding is not supported between the source node device and the destination node device, and the first message includes the address for the indirect data forwarding between the source node device and the destination node device.

In another possible implementation, the first node device directly includes, in the first message, the address for the direct data forwarding between the source node device and the destination node device, and the address for the indirect data forwarding between the source node device and the destination node device, and the source node device determines, based on an actual requirement, whether to perform the direct data forwarding.

With reference to the third aspect, in a possible implementation, the data sending method provided in this application further includes: The first node device obtains the address for the direct data forwarding between the source node device and the destination node device.

With reference to any one of the third aspect or the foregoing possible implementation, in a possible implementation, that the first node device obtains the address for the direct data forwarding between the source node device and the destination node device may be specifically implemented as follows: The first node device sends a second message to the destination node device based on an identifier of the destination node device, where the second message includes an identifier of the source node device. The first node device receives a response message of the second message from the destination node device, where the response message of the second message includes the address for the direct data forwarding between the source node device and the destination node device.

With reference to any one of the third aspect or the foregoing possible implementations, in a possible implementation, addresses for direct data forwarding between nodes are stored inside the first node device. That the first node device obtains the address for the direct data forwarding between the source node device and the destination node device may be specifically implemented as follows: querying internal data to determine the address for the direct data forwarding between the source node device and the destination node device.

With reference to any one of the third aspect or the foregoing possible implementations, in another possible implementation, the data sending method provided in this application may further include: The first node device determines whether the direct data forwarding is supported between the source node device and the destination node device.

With reference to any one of the third aspect or the foregoing possible implementations, in another possible implementation, that the first node device determines whether the direct data forwarding is supported between the source node device and the destination node device may be specifically implemented as follows: The first node device sends a third message to the source node device, where the third message includes the identifier of the destination node device. The first node device receives a response message of the third message from the source node device, where the response message of the third message includes a first indication, and the first indication is used to indicate whether the direct data forwarding is supported between the source node device and the destination node device. In this implementation, the first node device determines, via the source node device, whether the direct data forwarding is supported between the source node device and the destination node device.

With reference to any one of the third aspect or the foregoing possible implementations, in another possible implementation, that the first node device determines whether the direct data forwarding is supported between the source node device and the destination node device may be specifically implemented as follows: The first node device sends a fifth message to the destination node device, where the fifth message includes the identifier of the source node device. The first node device receives a response message of the fifth message from the destination node device, where the response message of the fifth message includes the first indication, and the first indication is used to indicate whether the direct data forwarding is supported between the source node device and the destination node device. In this implementation, the first node device determines, via the destination node device, whether the direct data forwarding is supported between the source node device and the destination node device.

It should be noted that the fifth message and the second message may be combined into one message, or may be two different messages. Optionally, the fifth message may be a node addition request message.

It should be noted that the first indication has been described in detail in the first aspect, and details are not described herein again.

With reference to any one of the third aspect or the foregoing possible implementations, in another possible implementation, information indicating whether the direct data forwarding is supported between the nodes is stored inside the first node device. That the first node device determines whether the direct data forwarding is supported between the source node device and the destination node device may be specifically implemented as follows: The first node device queries the internal data to determine whether the direct data forwarding is supported between the source node device and the destination node device. In this implementation, the first node device determines, based on the data of the first node device, whether the direct data forwarding is supported between the source node device and the destination node device.

With reference to any one of the third aspect or the foregoing possible implementations, in another possible implementation, the data sending method provided in this application may further include: The first node device receives a fourth message from the source node device, where the fourth message includes address indication information, and the address indication information is used to indicate an address selected by the source node device for data forwarding. The address indication information indicates whether the direct data forwarding or the indirect data forwarding is performed between the source node device and the destination node device.

Specifically, if the address indication information indicates that the indirect data forwarding is performed between the source node device and the destination node device, the first node device forwards, to the destination node device, data sent by the source node device. If the address indication information indicates that the direct data forwarding is performed between the source node device and the destination node device, the first node device ends waiting for data of the source node device.

With reference to any one of the third aspect or the foregoing possible implementations, in another possible implementation, the second message may include the node addition request message.

With reference to any one of the third aspect or the foregoing possible implementations, in another possible implementation, the first message may include a node release request message.

According to a fourth aspect, a data sending method is provided. The data sending method includes: A source node device receives a first message from a first node device, where the first message includes an address for direct data forwarding between the source node device and a destination node device, and/or an address for indirect data forwarding between the source node device and the destination node device. The source node device directly sends data to the destination node device based on the address for the direct data forwarding, or the source node device forwards data to the destination node device based on the address for the indirect data forwarding.

According to the data sending method provided in this application, the source node device receives the address for the direct data forwarding and/or the address for the indirect data forwarding from the first node device, and selects to perform the direct data forwarding or the indirect data forwarding. In this way, if the direct data forwarding is performed between the source node device and the destination node device, an SN change does not need to be forwarded via the first node device, and performance of a network in which the first node device is located is not affected.

With reference to the fourth aspect, in a possible implementation, the first message includes the address for the direct data forwarding between the source node device and the destination node device, and the source node device directly sends the data to the destination node device based on the address for the direct data forwarding.

With reference to any one of the fourth aspect or the foregoing possible implementation, in a possible implementation, the first message includes the address for the indirect data forwarding between the source node device and the destination node device, and the source node device forwards the data to the destination node device based on the address for the indirect data forwarding.

With reference to any one of the fourth aspect or the foregoing possible implementations, in another possible implementation, the first message includes an identifier of the destination node device, and the data sending method provided in this application may further include: The source node device determines, based on the identifier of the destination node device, whether the direct data forwarding is supported between the source node device and the destination node device.

With reference to any one of the fourth aspect or the foregoing possible implementations, in another possible implementation, after determining, based on the identifier of the destination node device, whether the direct data forwarding is supported between the source node device and the destination node device, if determining that the direct data forwarding is supported between the source node device and the destination node device, the source node device directly sends the data to the destination node device based on the address for the direct data forwarding; if determining that the direct data forwarding is not supported between the source node device and the destination node device, the source node device forwards the data to the destination node device based on the address for the indirect data forwarding.

With reference to any one of the fourth aspect or the foregoing possible implementations, in another possible implementation, the first message includes the address for the direct data forwarding between the source node device and the destination node device, and the address for the indirect data forwarding between the source node device and the destination node device. If determining, based on the identifier of the destination node device, that the direct data forwarding is supported between the source node device and the destination node device, the source node device directly sends the data to the destination node device based on the address for the direct data forwarding. If determining, based on the identifier of the destination node device, that the direct data forwarding is not supported between the source node device and the destination node device, the source node device forwards the data to the destination node device based on the address for the indirect data forwarding.

With reference to any one of the fourth aspect or the foregoing possible implementations, in another possible implementation, the data sending method provided in this application may further include: The source node device receives a third message from the first node device, where the third message includes the identifier of the destination node device. The source node device determines, based on the identifier of the destination node device, whether the direct data forwarding is supported between the source node device and the destination node device. The source node device sends a response message of the third message to the first node device, where the response message of the third message includes a first indication, and the first indication is used to indicate whether the direct data forwarding is supported between the source node device and the destination node device.

It should be noted that the first indication has been described in detail in the first aspect, and details are not described herein again.

With reference to any one of the fourth aspect or the foregoing possible implementations, in another possible implementation, the first indication included in the response message of the third message indicates that the direct data forwarding is supported between the source node device and the destination node device, and the first message includes the address for the direct data forwarding between the source node device and the destination node device.

With reference to any one of the fourth aspect or the foregoing possible implementations, in another possible implementation, the first indication included in the response message of the third message indicates that the direct data forwarding is not supported between the source node device and the destination node device, and the first message includes the address for the indirect data forwarding between the source node device and the destination node device.

With reference to any one of the fourth aspect or the foregoing possible implementations, in another possible implementation, regardless of whether the first indication included in the response message of the third message indicates the direct data forwarding is supported or not between the source node device and the destination node device, the first message includes the address for the direct data forwarding between the source node device and the destination node device, and the address for the indirect data forwarding between the source node device and the destination node device.

With reference to any one of the fourth aspect or the foregoing possible implementations, in another possible implementation, the data sending method provided in this application may further include: The source node device sends a fourth message to the first node device, where the fourth message includes address indication information, and the address indication information is used to indicate an address selected by the source node device for data forwarding.

It should be noted that the data sending methods provided in the third aspect and the fourth aspect are a same method described from perspectives of the first node device and the source node device respectively. For specific implementation of the data sending methods, reference may be made to each other, and details are not described herein again.

According to a fifth aspect, a data sending method is provided. The data sending method includes: A destination node device receives a second message from a first node device, where the second message includes an identifier of a source node device. The destination node device sends a response message of the second message to the first node device, where the response message of the second message includes an address for direct data forwarding between the source node device and the destination node device.

According to the data sending method provided in this application, the destination node device feeds back, to the first node device based on the identifier of the source node device in the second message sent by the first node device, the address for the direct data forwarding between the source node device and the destination node device. In this way, if the direct data forwarding is performed between the source node device and the destination node device, an SN change does not need to be forwarded via the first node device, and performance of a network in which the first node device is located is not affected.

With reference to the fifth aspect, in a possible implementation, the response message of the second message further includes a first indication, where the first indication is used to indicate whether the direct data forwarding is supported between the source node device and the destination node device.

It should be noted that the first indication has been described in detail in the first aspect, and details are not described herein again.

According to a sixth aspect, an embodiment of this application provides a data sending apparatus. The data sending apparatus may implement a function of a source node device in the foregoing method examples, and the function may be implemented by hardware, or may be implemented by hardware executing corresponding software. The hardware or the software includes one or more modules corresponding to the function.

With reference to the sixth aspect, in a possible implementation, a structure of the data sending apparatus includes a processor and a transceiver. The processor is configured to support the data sending apparatus in performing the corresponding function in the foregoing methods. The transceiver is configured to support communication between the data sending apparatus and another device. The data sending apparatus may further include a memory. The memory is configured to be coupled to the processor, and stores a program instruction and data that are necessary for the data sending apparatus.

According to a seventh aspect, an embodiment of this application provides a source node device, including an apparatus for implementing a function of the source node device in the foregoing method examples.

According to an eighth aspect, an embodiment of this application provides a data sending apparatus. The data sending apparatus may implement a function of the first node device in the foregoing method examples, and the function may be implemented by hardware, or may be implemented by hardware executing corresponding software. The hardware or the software includes one or more modules corresponding to the function.

With reference to the eighth aspect, in a possible implementation, a structure of the data sending apparatus includes a processor and a transceiver. The processor is configured to support the data sending apparatus in performing the corresponding function in the foregoing methods. The transceiver is configured to support communication between the data sending apparatus and another device. The data sending apparatus may further include a memory. The memory is configured to be coupled to the processor, and stores a program instruction and data that are necessary for the data sending apparatus.

According to a ninth aspect, an embodiment of this application provides a first node device, including an apparatus for implementing a function of the first node device in the foregoing method examples.

According to a tenth aspect, an embodiment of this application provides a data sending apparatus. The data sending apparatus may implement a function of the destination node device in the foregoing method examples, and the function may be implemented by hardware, or may be implemented by hardware executing corresponding software. The hardware or the software includes one or more modules corresponding to the function.

With reference to the tenth aspect, in a possible implementation, a structure of the data sending apparatus includes a processor and a transceiver. The processor is configured to support the data sending apparatus in performing the corresponding function in the foregoing methods. The transceiver is configured to support communication between the data sending apparatus and another device. The data sending apparatus may further include a memory. The memory is configured to be coupled to the processor, and stores a program instruction and data that are necessary for the data sending apparatus.

According to an eleventh aspect, an embodiment of this application provides a destination node device, including an apparatus for implementing a function of the destination node device in the foregoing method examples.

According to a twelfth aspect, an embodiment of this application provides a data sending system, including a source node device that implements the data sending method described in any one of the first aspect or the possible implementations of the first aspect, and the first node device in the data sending method described in any one of the second aspect or the possible implementations of the second aspect.

According to a thirteenth aspect, an embodiment of this application provides a data sending system, including a first node device that implements the data sending method described in any one of the third aspect or the possible implementations of the third aspect, and the source node device in the data sending method described in any one of the fourth aspect or the possible implementations of the fourth aspect.

According to a fourteenth aspect, an embodiment of this application provides a computer storage medium, configured to store a computer software instruction used by the foregoing first node device. The computer storage medium includes a program designed for executing the second aspect or the third aspect.

According to a fifteenth aspect, an embodiment of this application provides a computer storage medium, configured to store a computer software instruction used by the foregoing source node device. The computer storage medium includes a program designed for executing the first aspect or the fourth aspect.

According to a sixteenth aspect, an embodiment of this application provides a computer storage medium, configured to store a computer software instruction used by the foregoing destination node device. The computer storage medium includes a program designed for executing the fifth aspect.

According to a seventeenth aspect, an embodiment of this application provides a computer program product. When the computer program product runs on a computer, the computer is enabled to perform a program designed for executing the first aspect to the fifth aspect.

Solutions provided in the sixth aspect to the seventeenth aspect are used to implement the data sending methods provided in the first aspect to the fifth aspect, and therefore can achieve same beneficial effects as the first aspect to the fifth aspect. Details are not described herein again.

DESCRIPTION OF EMBODIMENTS

Figure 1:
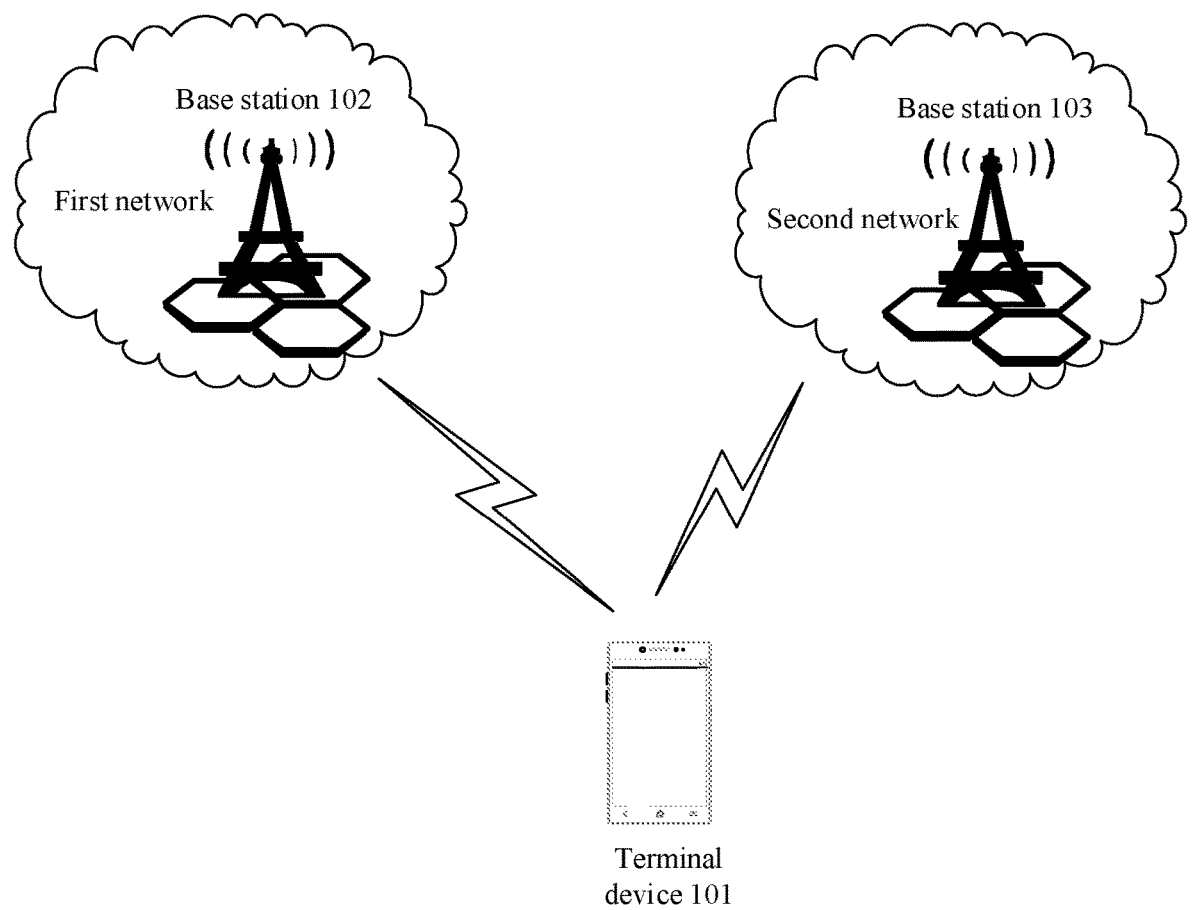
FIG. 1 is a schematic architectural diagram of a dual connectivity wireless communications system in the prior art.
Figure 1A:
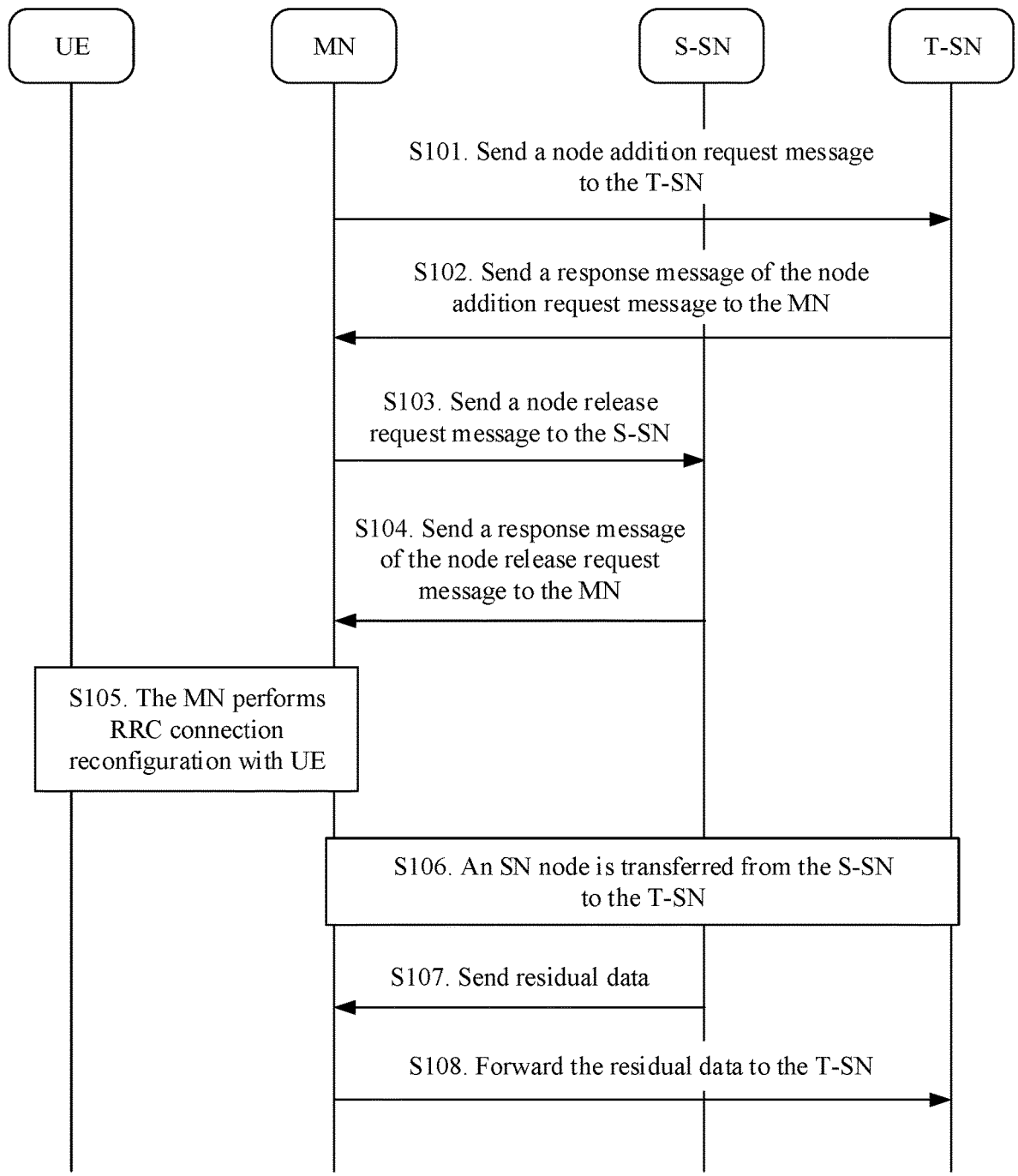
FIG. 1a is a schematic flowchart of a protocol procedure of an NR change in the related art.
Figure 1B:
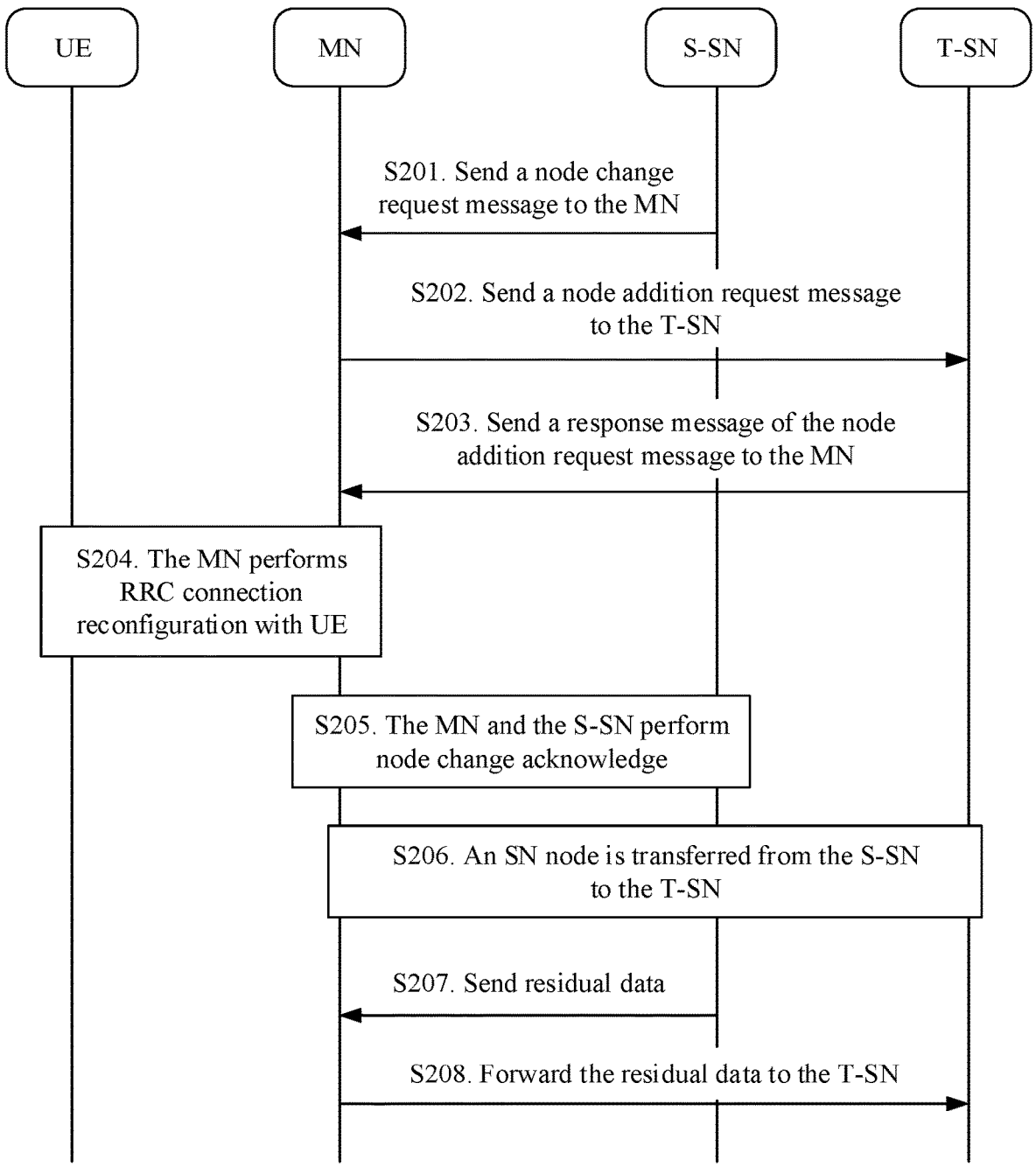
FIG. 1b is a schematic flowchart of another protocol procedure of an NR change in the related art.

A protocol procedure of an NR change is defined in the 3GPP 37.340 protocol, as shown in FIG. 1a and FIG. 1b. FIG. 1a shows a protocol procedure in which an MN actively initiates the NR change, and FIG. 1b defines a protocol procedure in which an SN actively initiates the NR change. The following briefly describes the protocol procedure that is of the NR change and that is defined in the 3GPP 37.340 protocol, and specific implementation thereof is not described in detail.

As shown in FIG. 1a, the protocol procedure in which the MN actively initiates the NR change may include the following steps:

S101. The MN sends a node addition request message to a T-SN.

S102. The T-SN sends a response message of the node addition request message to the MN.

S103. The MN sends a node release request message to an S-SN.

S104. The S-SN sends a response message of the node release request message to the MN.

S105. The MN performs RRC connection reconfiguration with UE.

S106. An SN node is transferred from the S-SN to the T-SN.

S107. The S-SN sends residual data to the MN.

S108. The MN forwards the residual data to the T-SN.

As shown in FIG. 1b, the protocol procedure in which the SN actively initiates the NR change may include the following steps:

S201. The SN sends a node change request message to an MN.

S202. The MN sends a node addition request message to a T-SN.

S203. The T-SN sends a response message of the node addition request message to the MN.

S204. The MN performs RRC connection reconfiguration with UE.

S205. The MN and an S-SN perform node change acknowledge.

S206. An SN node is transferred from the S-SN to the T-SN.

S207. The S-SN sends residual data to the MN.

S208. The MN forwards the residual data to the T-SN.

In S107, S108, S207, and S208 of the protocol procedures that are of the NR change and that are defined in the 3GPP 37.340 protocol shown in FIG. 1a and FIG. 1b, the residual data is forwarded to the T-SN via the MN. Coverage of NR is smaller than that of LTE. Therefore, an SN change procedure frequently occurs on an NR side. Consequently, a large quantity of residual data generated due to the frequent SN changes is forwarded, and performance of an LTE network degrades.

Based on this, this application provides a data sending method. The method is used by a source node device to send data to a destination node device in a dual connectivity node change procedure. A basic principle of the method is as follows: In the dual connectivity node change procedure, the source node device directly transmits the data to the destination node device, to avoid forwarding by another node device, to improve data forwarding efficiency in the dual connectivity node change procedure.

The node device described in this application may be a part or all of base stations in two networks accessed by a terminal device in dual connectivity technologies. When the node device is the part of the base stations, the node device may be a function unit or at least one chip in the base stations. A base station is a network side device that provides a communication service for a terminal device in a wireless communications system. In wireless communications systems of different standards, the base station may have different names, but each name may be understood as the base station described in this application. A type of the base station is not specifically limited in embodiments of this application. For example, a base station in a universal mobile telecommunications system (Universal Mobile Telecommunications System, UMTS) is referred to as a base station (Base Station, BS). A base station in an LTE system is referred to as an evolved NodeB (evolved Node B, eNB). A base station in a 5G system is referred to as a next-generation base station (generation NodeB, gNB). The rest is not listed one by one herein. Any network side device that provides the communication service for the terminal device in the wireless communications system may be understood as the base station described in this application.

The terminal device described in this application is a part or all of a mobile communications device used by a user. For example, the terminal device may be user equipment (User Equipment, UE) or another device. The UE may be a mobile phone, a tablet computer, a notebook computer, an ultra-mobile personal computer (Ultra-mobile Personal Computer, UMPC), a netbook, a personal digital assistant (Personal Digital Assistant, PDA), an e-book, a mobile television, a wearable device, or a personal computer (Personal Computer, PC). In communications systems of different standards, the terminal device may have different names. A type of the terminal device is not specifically limited in the embodiments of this application either.

The data sending method provided in this application is applied to a dual connectivity wireless communications system architecture shown in FIG. 1. As shown in FIG. 1, the dual connectivity wireless communications system architecture includes a terminal device 101, a base station 102 of a first network, and a base station 103 of a second network. The terminal device 101 obtains data from both the first network and the second network by using radio resources of the base stations 102 and 103.

It should be noted that FIG. 1 is merely a schematic diagram of the dual connectivity wireless communications system architecture by using an example. Quantities and types of the terminal device 101, the base station 102, and the base station 103 included in the dual connectivity wireless communications system architecture may be configured based on an actual requirement. FIG. 1 does not specifically limit the content.

It should be further noted that the node device described in this application may be a part or all of the base station 102 or the base station 103 shown in FIG. 1. Therefore, the base station 102 or the base station 103 shown in FIG. 1 represents the node device described in this application, and may be directly replaced for application. Details are not described herein again.

In an example, the first network in the dual connectivity wireless communications system architecture shown in FIG. 1 may be the LTE network, and the second network may be a 5G network or another network. A type of a network to which a solution of this application is applied is not specifically limited in the embodiments of this application.

Before the embodiments of this application are described, terms used in the embodiments of this application are explained herein.

The source node device is a node device released from a network when a node is changed in a dual connectivity architecture.

The destination node device is a node device added to the network to replace the source node device when the node is changed in the dual connectivity architecture.

A first node device is a base station device in a network other than a network in which the source node device is located in the dual connectivity architecture.

The node change procedure is a process of replacing the source node device with the destination node device in the dual connectivity architecture.

Direct data forwarding is a manner in which data is directly sent between nodes.

In the specification and claims in the embodiments of this application, the terms "first", "second", and so on are intended to distinguish between different objects but do not indicate a particular order of the objects. For example, the first network device and the second network device are used to distinguish between different network devices, but are not used to describe a specific sequence of the devices.

In addition, in the embodiments of this application, the word "exemplary" or "for example" is used to represent giving an example, an illustration, or a description. Any embodiment or design scheme described as "exemplary" or "for example" in the embodiments of this application should not be explained as being more preferred or having more advantages than another embodiment or design scheme. Exactly, use of the word "exemplary" or "example" or the like is intended to present a relative concept in a specific manner for ease of understanding.

The following describes in detail the embodiments of this application with reference to the accompanying drawings.

Figure 2:
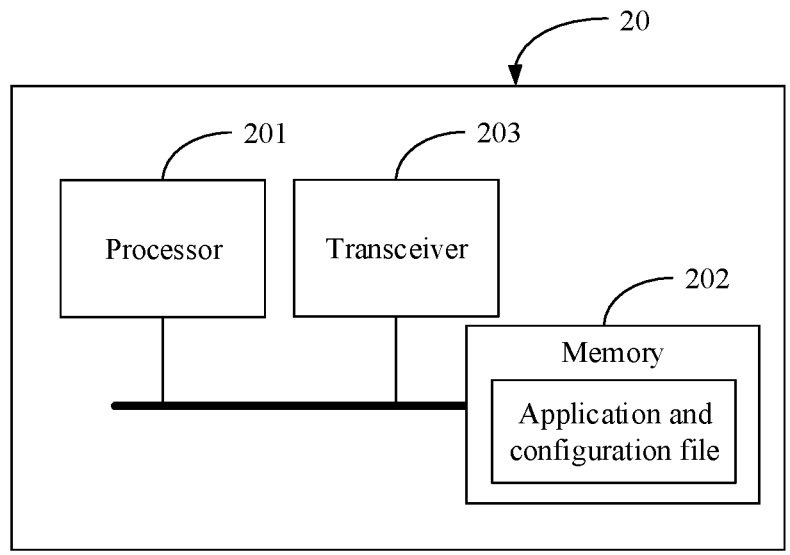
FIG. 2 is a schematic structural diagram of a source node device according to an embodiment of this application.

According to one aspect, an embodiment of this application provides a source node device. FIG. 2 shows a source node device 20 related to the embodiments of this application. The source node device 20 may be a part of or all of the base station 102 or the base station 103 in the dual connectivity wireless communications system architecture shown in FIG. 1. As shown in FIG. 2, the source node device 20 may include a processor 201, a memory 202, and a transceiver 203.

The following describes each component of the source node device 20 in detail with reference to FIG. 2.

The memory 202 may be a volatile memory (volatile memory) such as a random-access memory (random-access memory, RAM), a non-volatile memory (non-volatile memory) such as a read-only memory (read-only memory, ROM), a flash memory (flash memory), a hard disk (hard disk drive, HDD), or a solid-state drive (solid-state drive, SSD), or a combination of the foregoing types of memories, configured to store program code and a configuration file that can implement the method in this application.

The processor 201 is a control center of the source node device 20, and may be a central processing unit (central processing unit, CPU), an application-specific integrated circuit (Application Specific Integrated Circuit, ASIC), one or more integrated circuits, for example, one or more digital signal processor (digital signal processor, DSP), or one or more field programmable gate arrays (Field Programmable Gate Array, FPGA), configured to implement this embodiment of this application. The processor 201 may run or execute a software program and/or a module stored in the memory 202 and invoke data stored in the memory 202, to perform various functions of the source node device 20.

The transceiver 203 is configured to enable the source node device 20 to interact with another unit. For example, the transceiver 203 may be a transceiver antenna or a transceiver function unit of the source node device 20.

In a possible implementation, when the source node device 20 actively initiates a node change procedure, the processor 201 runs or executes the software program and/or the module stored in the memory 202, and invokes the data stored in the memory 202, to perform the following functions:

determining whether direct data forwarding is supported between the source node device and a destination node device, and sending a first message to a first node device via the transceiver 203, where the first message includes a first indication, and the first indication is used to indicate whether the direct data forwarding is supported between the source node device and the destination node device.

In a possible implementation, when the first node device actively initiates a node change procedure, the processor 201 runs or executes the software program and/or the module stored in the memory 202, and invokes the data stored in the memory 202, to perform the following functions:

receiving the first message from the first node device via the transceiver 203, where the first message includes an address for the direct data forwarding between the source node device 20 and the destination node device, and/or an address for indirect data forwarding between the source node device 20 and the destination node device; and directly sending the data to the destination node device based on the address for the direct data forwarding, or forwarding the data to the destination node device based on the address for the indirect data forwarding.

Figure 3:
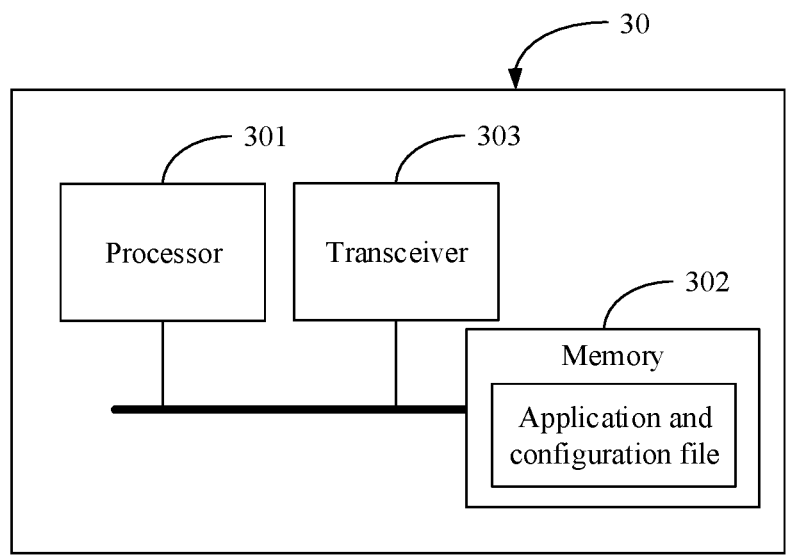
FIG. 3 is a schematic structural diagram of a first node device according to an embodiment of this application.

According to another aspect, an embodiment of this application provides a first node device. FIG. 3 shows a first node device 30 related to the embodiments of this application. The first node device 30 may be a part of or all of the base station 102 or the base station 103 in the dual connectivity wireless communications system architecture shown in FIG. 1. As shown in FIG. 3, the first node device 30 may include a processor 301, a memory 302, and a transceiver 303.

The following describes each component of the first node device 30 in detail with reference to FIG. 3.

The memory 302 may be a volatile memory such as a RAM, a non-volatile memory such as a ROM, a flash memory, an HDD, or an SSD, or a combination of the foregoing types of memories. The memory 302 is configured to store program code and a configuration file that can implement a method in this application.

As a control center of the first node device 30, the processor 301 may be a CPU or an ASIC, or is configured as one or more integrated circuits, for example, one or more DSPs or one or more FPGAs, for implementing the embodiments of this application. The processor 301 may run or execute a software program and/or a module stored in the memory 302 and invoke data stored in the memory 302, to perform various functions of the first node device 30.

The transceiver 303 is configured to enable the first node device 30 to interact with another unit. For example, the transceiver 303 may be a transceiver antenna, a transceiver circuit, or a transceiver apparatus of the first node device 30.

In a possible implementation, when the first node device 30 actively initiates a node change procedure, the processor 301 runs or executes a software program and/or a module stored in the memory 302, and invokes data stored in the memory 302, to perform the following functions:

sending a first message to a source node device via the transceiver 303, where the first message includes an address for direct data forwarding between the source node device and a destination node device, and/or an address for indirect data forwarding between the source node device and the destination node device.

In a possible implementation, when the source node device actively initiates the node change procedure, the processor 301 runs or executes the software program and/or the module stored in the memory 302, and invokes the data stored in the memory 302, to perform the following functions:

receiving, via the transceiver 303, the first message from the source node device, where the first message includes a first indication and an identifier of the destination node device, and the first indication is used to indicate whether the direct data forwarding is supported between the source node device and the destination node device; and sending, via the transceiver 303, a response message of the first message to the source node device, where the response message of the first message includes the address for the direct data forwarding between the source node device and the destination node device, or the response message of the first message includes the address for the indirect data forwarding between the source node device and the destination node device.

Figure 4:
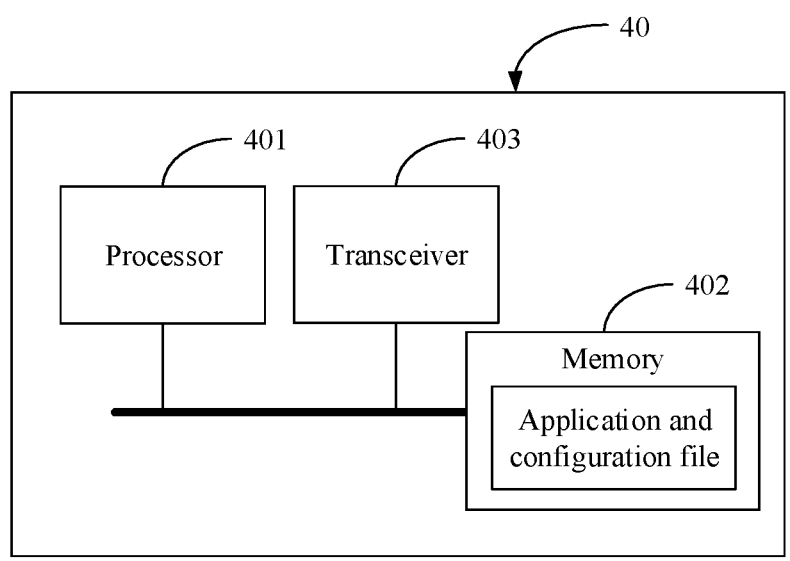
FIG. 4 is a schematic structural diagram of a destination node device according to an embodiment of this application.

According to another aspect, an embodiment of this application provides a destination node device. FIG. 4 shows a destination node device 40 related to the embodiments of this application. The destination node device 40 may be a node device used to replace, in a node change procedure, the base station 102 or 103 in the dual connectivity wireless communications system architecture shown in FIG. 1. As shown in FIG. 4, the destination node device 40 may include a processor 401, a memory 402, and a transceiver 403.

The following describes each component of the destination node device 40 in detail with reference to FIG. 4.

The memory 402 may be a volatile memory such as a RAM, a non-volatile memory such as a ROM, a flash memory, an HDD, or an SSD, or a combination of the foregoing types of memories. The memory 402 is configured to store program code and a configuration file that can implement a method in this application.

As a control center of the destination node device 40, the processor 401 may be a CPU or an ASIC, or is configured as one or more integrated circuits, for example, one or more DSPs or one or more FPGAs, for implementing the embodiments of this application. The processor 401 may run or execute a software program and/or a module stored in the memory 402 and invoke data stored in the memory 402, to perform various functions of the destination node device 40.

The transceiver 403 is configured to enable the destination node device 40 to interact with another unit. For example, the transceiver 403 may be a transceiver antenna, a transceiver circuit, or a transceiver apparatus of the destination node device 40.

In a possible implementation, the processor 401 runs or executes the software program and/or the module stored in the memory 402, and invokes the data stored in the memory 402, to perform the following functions:

receiving a first message from a first node device via the transceiver 403, where the first message includes an identifier of a source node device; and sending a response message of the first message to the first node device via the transceiver 403, where the response message of the first message includes an address for direct data forwarding between the source node device and the destination node device.

According to still another aspect, an embodiment of this application provides a data sending method, applied to an interaction process of nodes in a node change procedure initiated by a source node device in a dual connectivity network. The data sending method provided in this embodiment of this application may be performed by a node in the dual connectivity network, or may be performed by a function unit or a chip in a node. This is not specifically limited in this embodiment of this application. In descriptions of the following embodiment, an action performed by the source node device/a destination node device/a first node device may also be performed by a function unit or a chip of the source node device/destination node device/first node device, and details are not described.

Figure 5:
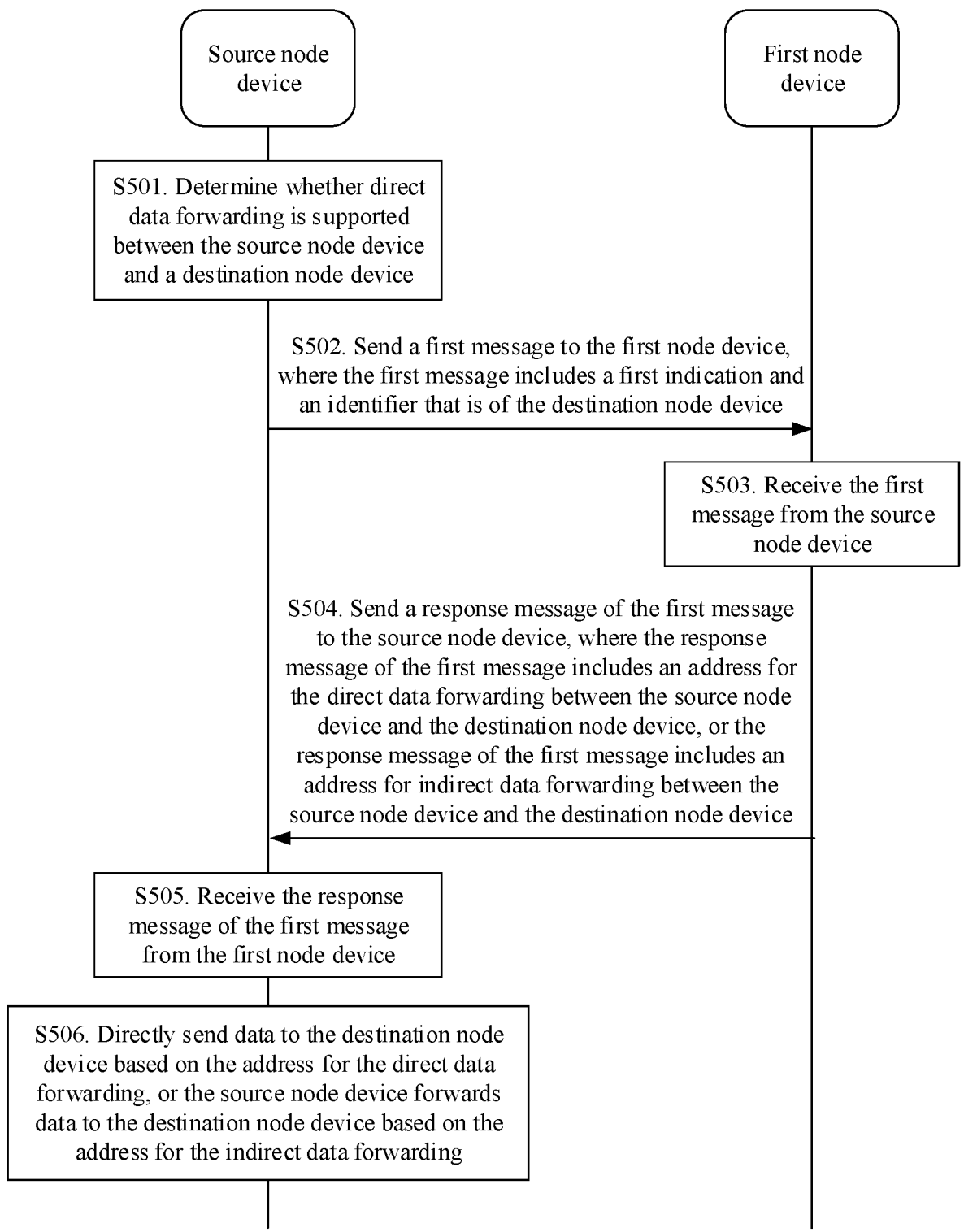
FIG. 5 is a schematic flowchart of a data sending method according to an embodiment of this application.

As shown in FIG. 5, the data sending method provided in this embodiment of this application may include the following steps.

S501. The source node device determines whether direct data forwarding is supported between the source node device and the destination node device.

The node change procedure to which the data sending method shown in FIG. 5 is applied is actively initiated by the source node device. Therefore, the destination node device is determined by the source node device.

In a possible implementation, this embodiment of this application provides a specific implementation in which the source node device determines whether the direct data forwarding is supported between the source node device and the destination node device: The source node device stores an identifier of nodes that can perform the direct data forwarding. The source node device queries, based on an identifier of the destination node device in the current node change procedure, data stored inside. If the data includes the identifier of the destination node device, the source node device determines that the direct data forwarding is supported between the source node device and the destination node device. If the data does not include the identifier of the destination node device, the source node device determines that the direct data forwarding is not supported between the source node device and the destination node device.

In another possible implementation, this embodiment of this application provides a specific implementation in which the source node device determines whether the direct data forwarding is supported between the source node device and the destination node device: The source node device stores information about whether the direct data forwarding is supported between the source node device and each node that is in a network. The source node device queries, based on an identifier of the destination node device in the current node change procedure, the information stored inside, and determines whether the direct data forwarding is supported between the source node device and the destination node device.

In another possible implementation, this embodiment of this application provides a specific implementation in which the source node device determines whether the direct data forwarding is supported between the source node device and the destination node device: The source node device sends a test message to the destination node device based on an identifier of the destination node device. If receiving a response message of the test message within preset duration, the source node device determines that the direct data forwarding is supported between the source node device and the destination node device; otherwise, the source node device determines that the direct data forwarding is not supported between the source node device and the destination node device.

A type and content of the test message may be configured based on an actual requirement. This is not specifically limited in this embodiment of this application. It should be noted that, if the test message is used to determine whether the direct data forwarding is supported between the source node device and the destination node device, a node device in a network needs to be configured, so that the node device can respond to the test message when used as the destination node device.

It should be noted that, in an actual application, that the source node device determines whether the direct data forwarding is supported between the source node device and the destination node device in S501 may be configured based on an actual requirement. A specific implementation in which the source node device determines whether the direct data forwarding is supported between the source node device and the destination node device in S501 is not limited in this embodiment of this application.

S502. The source node device sends a first message to the first node device, where the first message includes a first indication and the identifier of the destination node device.

The first indication is used to indicate whether the direct data forwarding is supported between the source node device and the destination node device.

Optionally, the first indication may be a mandatory information element, and whether the direct data forwarding is supported between the source node device and the destination node device is explicitly indicated based on different values of the first indication.

For example, when the first indication is the mandatory information element, the value of the first indication may be true, used to indicate that the direct data forwarding is supported between the source node device and the destination node device, or the value of the first indication may be false, used to indicate that the direct data forwarding is not supported between the source node device and the destination node device. Certainly, when the first indication is the mandatory information element, a specific value of the first indication may be configured based on an actual requirement. This is not specifically limited in this application.

Optionally, the first indication may be an optional information element, and whether the direct data forwarding is supported between the source node device and the destination node device is indicated when a value of the information element is carried and not carried. The value of the information element may be defined as supporting the direct data forwarding. When the optional information element is carried, it indicates that the direct data forwarding is supported between the source node device and the destination node device; when the optional information element is not carried, it indicates that the direct data forwarding is not supported between the source node device and the destination node device. Alternatively, the value of the information element may be defined as not supporting the direct data forwarding. When the optional information element is not carried, it indicates that the direct data forwarding is supported between the source node device and the destination node device; when the optional information element is carried, it indicates that the direct data forwarding is not supported between the source node device and the destination node device.

For example, when the first indication is the optional information element, the value of the information element may be defined as true. If the value of the information element is carried, it indicates that the direct data forwarding is supported between the source node device and the destination node device. If the value of the information element is not carried, it indicates that the direct data forwarding is not supported between the source node device and the destination node device.

For example, when the first indication is the optional information element, the value of the information element may be defined as false. If the value of the information element is carried, it indicates that the direct data forwarding is not supported between the source node device and the destination node device. If the value of the information element is not carried, it indicates that the direct data forwarding is supported between the source node device and the destination node device.

It should be noted that content of a specific value of the information element of the first indication and a definition of the content may be configured based on an actual requirement. This is not specifically limited in this embodiment of this application.

It should be noted that a location of the first indication in the first message may be configured based on an actual requirement. This is not specifically limited in this embodiment of this application.

Optionally, the first message may be a configured dedicated message for sending the first indication, or may be an existing interaction message between the source node device and the first node device. A type of the first message is not specifically limited in this embodiment of this application.

For example, the first message may include a node change request message sent by the source node device to the first node device in the node change procedure.

S503. The first node device receives the first message from the source node device.

The first message includes the first indication and the identifier of the destination node device, where the first indication is used to indicate whether the direct data forwarding is supported between the source node device and the destination node device.

It should be noted that the first message received by the first node device in S503 is the first message sent by the source node device in S502. The first message has been described in detail in S502, and details are not described herein again.

S504. The first node device sends a response message of the first message to the source node device, where the response message of the first message includes an address for the direct data forwarding between the source node device and the destination node device, or the response message of the first message includes an address for indirect data forwarding between the source node device and the destination node device.

Specifically, in S504, content included in the response message of the first message may be configured based on an actual requirement. This is not specifically limited in this embodiment of this application. Optionally, the response message that is of the first message and that is sent by the first node device to the source node device may include different content. Specifically, the following three cases are included:

In the first case, the first indication in the first message indicates that the direct data forwarding is supported between the source node device and the destination node device, and the response message of the first message includes the address for the direct data forwarding between the source node device and the destination node device.

In the second case, the first indication in the first message indicates that the direct data forwarding is not supported between the source node device and the destination node device, and the response message of the first message includes the address for the indirect data forwarding between the source node device and the destination node device.

Optionally, the address for the indirect data forwarding may be an address of the first node device. Certainly, the address for the indirect data forwarding may alternatively be an address of a forwarding device. This is not specifically limited in this embodiment of this application.

In the third case, the first indication in the first message indicates that the direct data forwarding is supported between the source node device and the destination node device, and the response message of the first message includes the address for the indirect data forwarding between the source node device and the destination node device.

It should be noted that the foregoing three cases are merely examples for description of the content of the response message of the first message, and do not specifically limit the content of the response message of the first message. In an actual application, the content of the response message of the first message can be configured based on an actual requirement.

The address that is for the direct data forwarding and that is described throughout this application is an address at which the destination node device directly receives data. The address that is for the indirect data forwarding and that is described throughout this application is an address at which a device that forwards data to the destination node device receives the data. The device that forwards the data to the destination node device may be the first node device.

S505. The source node device receives the response message of the first message from the first node device.

The response message of the first message includes the address for the direct data forwarding between the source node device and the destination node device, or the response message of the first message includes the address for the indirect data forwarding between the source node device and the destination node device.

It should be noted that the response message that is of the first message and that is received by the source node device in S505 is the response message that is of the first message and that is sent by the first node device in S504. The response message of the first message has been described in detail in S504, and details are not described herein again.

S506. The source node device directly sends the data to the destination node device based on the address for the direct data forwarding, or the source node device forwards the data to the destination node device based on the address for the indirect data forwarding.

Specifically, the source node device determines a specific operation in S506 based on the content of the response message that is of the first message and that is received in S505.

Optionally, the specific operation in S506 may include the following case 1 and case 2:

Case 1: The response message of the first message includes only the address for the direct data forwarding between the source node device and the destination node device. In S506, the source node device directly sends the data to the destination node device based on the address for the direct data forwarding.

That the source node device directly sends the data to the destination node device based on the address for the direct data forwarding means that the source node device directly sends the data to the address for the direct data forwarding, and the data is directly sent to the destination node device.

Case 2: The response message of the first message includes only the address for the indirect data forwarding between the source node device and the destination node device. In S506, the source node device forwards the data to the destination node device based on the address for the indirect data forwarding.

That the source node device forwards the data to the destination node device based on the address for the indirect data forwarding means that the source node device sends the data to the address for the indirect data forwarding, and the device indicated by the address for the indirect data forwarding forwards the data to the destination node device.

According to the data sending method provided in this application, the source node device sends the first indication in the first message, to indicate, to the first node device, that the source node device determines whether the data can be sent between the source node device and the destination node device in a direct data forwarding manner. In this way, if the direct data forwarding is performed between the source node device and the destination node device, a data packet in an SN change initiated by the source node device this time does not need to be forwarded via the first node device, and performance of a network in which the first node device is located is not affected.

Figure 6:
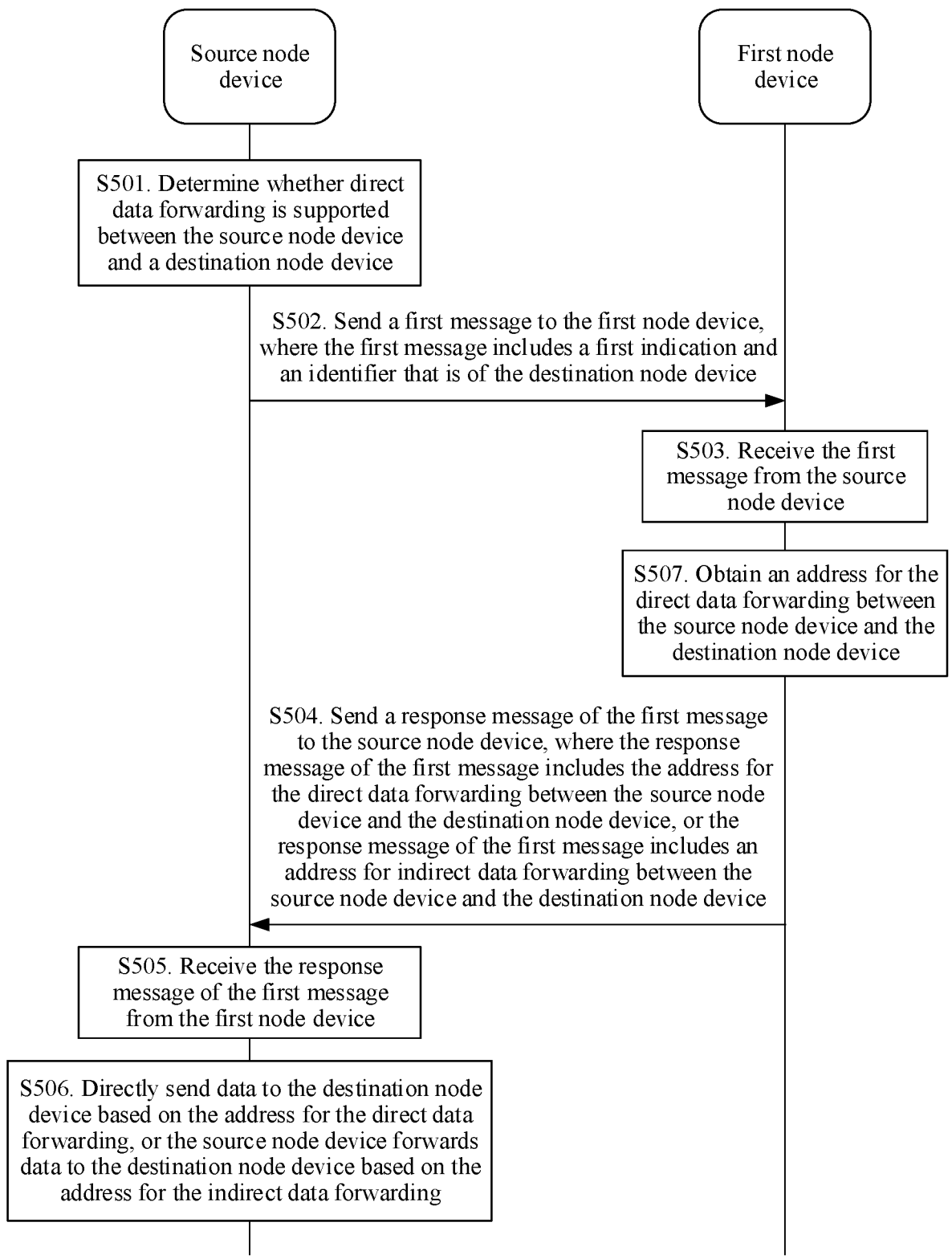
FIG. 6 is a schematic flowchart of another data sending method according to an embodiment of this application.

Further, as shown in FIG. 6, before S504, the data sending method provided in this embodiment of this application may further include S507.

S507. The first node device obtains the address for the direct data forwarding between the source node device and the destination node device.

Optionally, in S507, the first node device may request to obtain, from the destination node device, the address for the direct data forwarding between the source node device and the destination node device, which may be specifically implemented in the following S5071 to S5074.

S5071. The first node device sends a second message to the destination node device based on the identifier of the destination node device.

The second message includes an identifier of the source node device. The second message is used to obtain, from the destination node device, the address for the direct data forwarding between the source node device and the destination node device.

Optionally, the second message may be a configured dedicated message for obtaining the address for the direct data forwarding between the source node device and the destination node device, or may be an existing interaction message between the first node device and the destination node device. A type of the second message is not specifically limited in this embodiment of this application.

For example, the second message may include a node addition request message sent by the first node device to the destination node device in the node change procedure.

S5072. The destination node device receives the second message sent by the first node device.

It should be noted that the second message described in S5072 is the same as the second message described in S5071, and details are not described herein again.

S5073. The destination node device sends a response message of the second message to the first node device.

The response message of the second message includes the address for the direct data forwarding between the source node device and the destination node device.

Specifically, the address for the direct data forwarding is an address of the destination node device.

S5074. The first node device receives the response message of the second message from the destination node device.

It should be noted that the response message that is of the second message and that is described in S5074 is the same as the response message that is of the second message and that is described in S5073, and details are not described herein again.

Optionally, in a possible implementation, the first node device stores direct transfer addresses of nodes, and S507 may be specifically implemented as follows: The first node device queries, based on the identifier of the source node device, and the identifier of the destination node device, the direct transfer addresses stored inside the first node device, to obtain the address for the direct data forwarding between the source node device and the destination node device.

Certainly, S507 may be alternatively implemented in another manner. This is not listed one by one herein. In an actual application, any method that can be used by the first node device to obtain the address for the direct data forwarding between the source node device and the destination node device may be applied to this. This is not specifically limited in this embodiment of this application.

According to still another aspect, an embodiment of this application provides another data sending method, applied to an interaction process of nodes in a node change procedure initiated by a first node device in a dual connectivity network. The data sending method provided in this embodiment of this application may be performed by a node in the dual connectivity network, or may be performed by a function unit or a chip in a node. This is not specifically limited in this embodiment of this application. In descriptions of the following embodiment, an action performed by a source node device/a destination node device/the first node device may also be performed by a function unit or a chip of the source node device/destination node device/first node device, and details are not described.

Figure 7:
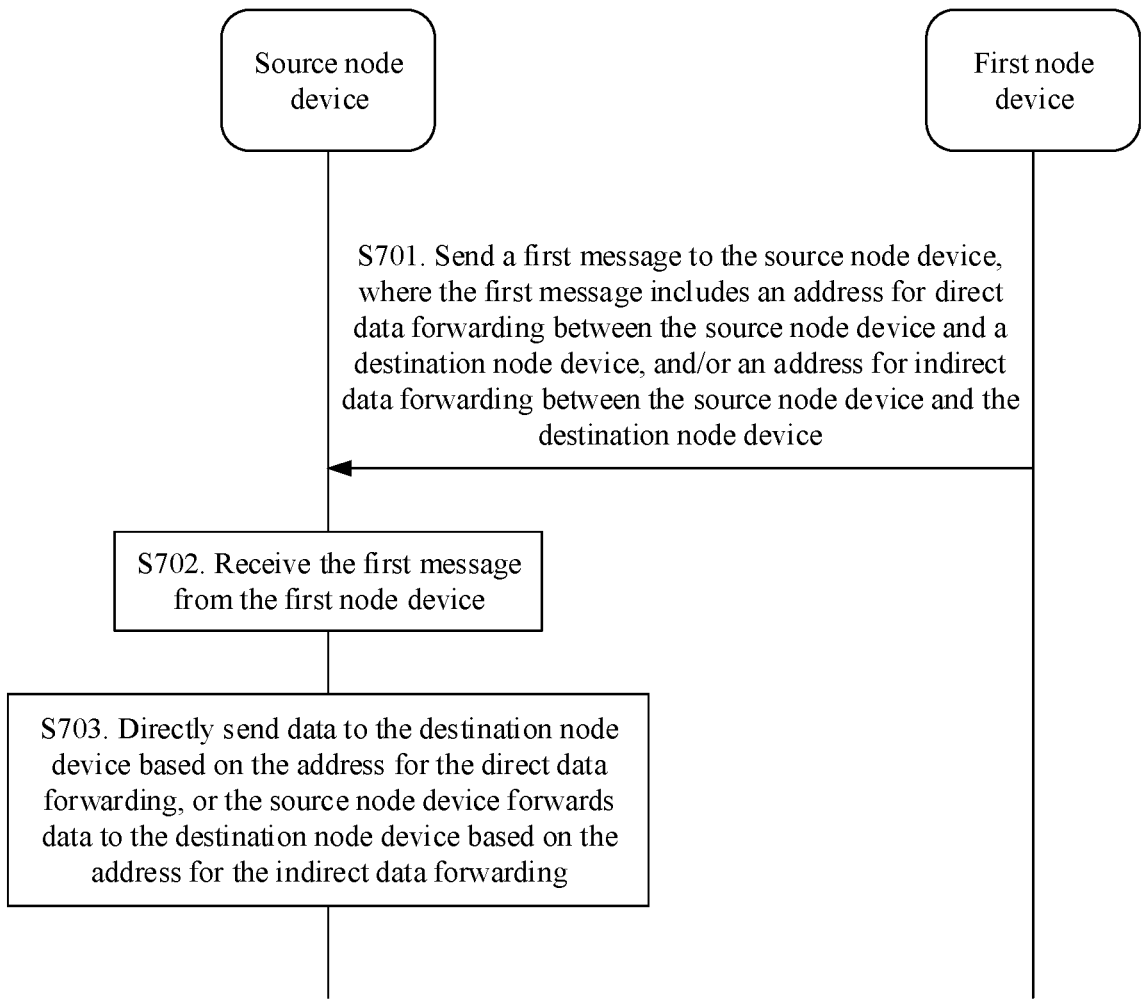
FIG. 7 is a schematic flowchart of still another data sending method according to an embodiment of this application.

As shown in FIG. 7, the data sending method provided in this embodiment of this application may include the following steps.

S701. The first node device sends a first message to the source node device, where the first message includes an address for direct data forwarding between the source node device and the destination node device, and/or an address for indirect data forwarding between the source node device and the destination node device.

In the data sending method shown in FIG. 7, the first node device actively initiates the node change procedure. Therefore, the first node device already knows the source node device and the destination node device. If already knowing the address for the direct data forwarding between the source node device and the destination node device, or the address for the indirect data forwarding between the source node device and the destination node device, the first node device sends the first message to the source node device.

It should be noted that specific content of the first message in S701 may be configured based on an actual requirement. This is not specifically limited in this embodiment of this application.

Optionally, several implementations of determining the specific content of the first message in S701 are provided herein, but the implementations of determining the specific content of the first message are not specifically limited. Specifically, the implementations of determining the specific content of the first message in S701 may include but is not limited to the following implementations.

Implementation 1: The first node device actively provides, to the source node device, the address for direct data forwarding between the source node device and the destination node device and the address for the indirect data forwarding between the source node device and the destination node device, so that the source node device determines whether to perform direct transfer. In this implementation, the first message includes the address for the direct data forwarding between the source node device and the destination node device, and the address for the indirect data forwarding between the source node device and the destination node device.

Implementation 2: The first node device determines whether the direct data forwarding is supported between the source node device and the destination node device. If the first node device determines that the direct data forwarding is supported, the first message includes the address provided by the source node device for the direct data forwarding between the source node device and the destination node device. If the first node device determines that the direct data forwarding is not supported, the first message includes the address provided by the source node device for the indirect data forwarding between the source node device and the destination node device.

Optionally, the implementation 2 may be applied to a scenario in which the first node device can accurately determine whether the direct data forwarding is supported between the source node device and the destination node device. For example, the first node device determines, via the source node device, whether the direct data forwarding is supported between the source node device and the destination node device. Because of unidirectional communication between the source node device and the destination node device, it is more accurate for the source node device to determine whether the direct data forwarding is supported. Certainly, the implementation 2 may also be applied to another scenario. This is not specifically limited in this embodiment of this application.

Implementation 3: The first node device determines whether the direct data forwarding is supported between the source node device and the destination node device. However, regardless of whether the direct data forwarding is supported, the first message includes the address provided by the source node device for the direct data forwarding between the source node device and the destination node device, and the address provided by the source node device for the indirect data forwarding between the source node device and the destination node device.

Optionally, the implementation 3 may be applied to a scenario in which the first node device cannot accurately determine whether the direct data forwarding is supported between the source node device and the destination node device. For example, in a scenario in which the first node device determines, via the destination node device, whether the direct data forwarding is supported between the source node device and the destination node device, the first node device determines, based on data stored in the first node device, whether the direct data forwarding is supported between the source node device and the destination node device, or the like, because of unidirectional communication between the source node device and the destination node device, it is not accurate enough for a device other than the source node device to determine whether the direct data forwarding is supported. Certainly, the implementation 3 may also be applied to another scenario. This is not specifically limited in this embodiment of this application.

Optionally, the first message in S701 may be a configured dedicated message, or may be an existing interaction message between the source node device and the first node device. A type of the first message is not specifically limited in this embodiment of this application.

For example, the first message may include a node release request message sent by the first node device to the source node device in the node change procedure.

S702. The source node device receives the first message from the first node device.

The first message received in S702 is the first message sent by the first node device in S701. The first message has been described in detail in S701, and details are not described herein again.

S703. The source node device directly sends the data to the destination node device based on the address for the direct data forwarding, or the source node device forwards the data to the destination node device based on the address for the indirect data forwarding.

Specifically, the source node device determines a specific operation in S703 based on content of the first message received in S702.

Optionally, the specific operation in S703 may include the following case A, case B, and case C.

Case A: The first message includes only the address for the direct data forwarding between the source node device and the destination node device. In S703, the source node device directly sends the data to the destination node device based on the address for the direct data forwarding.

That the source node device directly sends the data to the destination node device based on the address for the direct data forwarding means that the source node device directly sends the data to the address for the direct data forwarding, and the data is directly sent to the destination node device.

Case B: The first message includes only the address for the indirect data forwarding between the source node device and the destination node device. In S703, the source node device forwards the data to the destination node device based on the address for the indirect data forwarding.

That the source node device forwards the data to the destination node device based on the address for the indirect data forwarding means that the source node device sends the data to the address for the indirect data forwarding, and a device indicated by the address for the indirect data forwarding forwards the data to the destination node device.

Case C: The first message includes the address for the direct data forwarding between the source node device and the destination node device, and the address for the indirect data forwarding between the source node device and the destination node device. Before S703, the source node device first determines whether the direct data forwarding is supported between the source node device and the destination node device, and S703 is then performed for sending the data.

Figure 8:
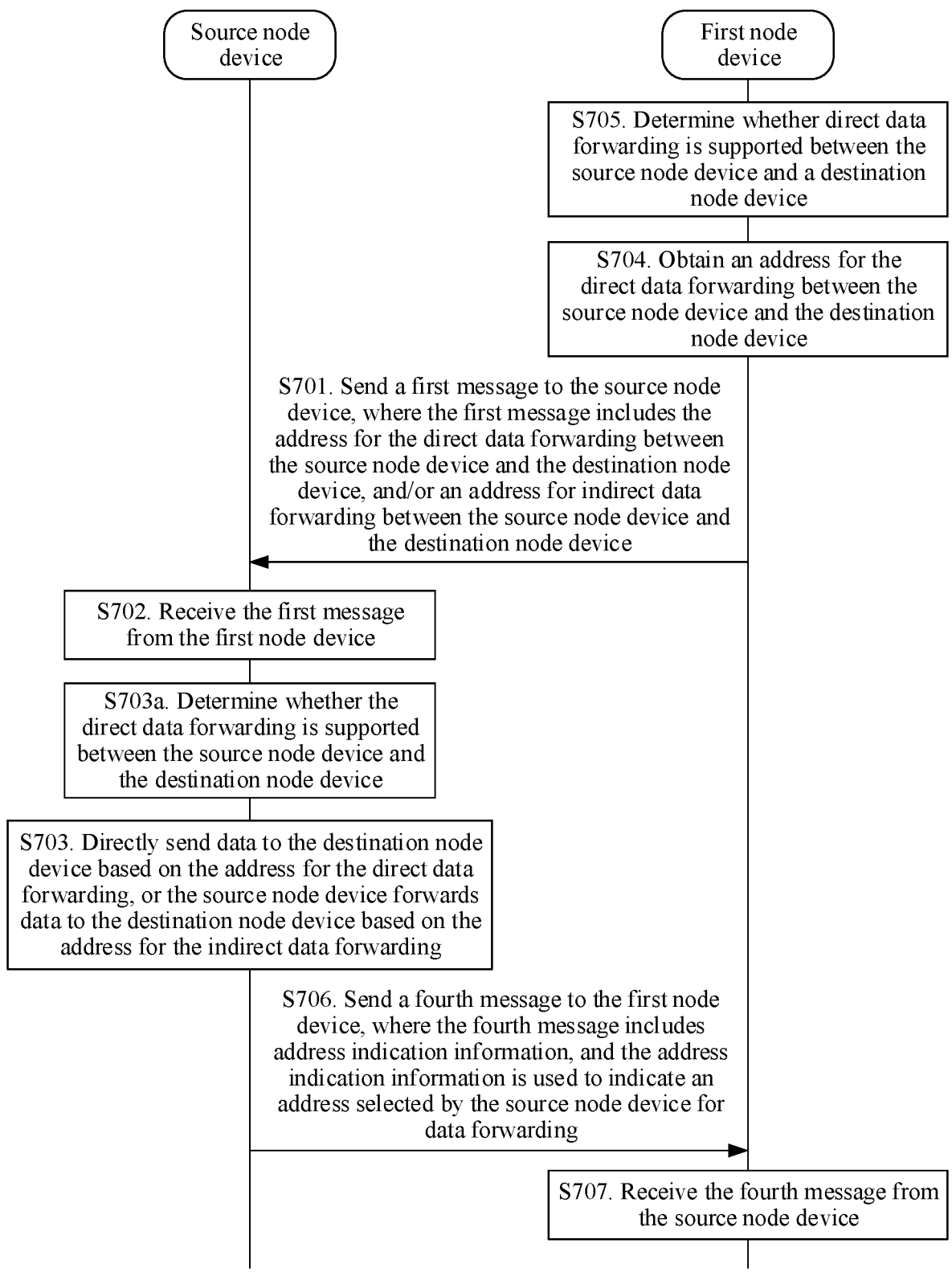
FIG. 8 is a schematic flowchart of yet another data sending method according to an embodiment of this application.

Corresponding to case C, as shown in FIG. 8, before S703, the data sending method provided in this embodiment of this application may further include S703a.

S703a. The source node device determines whether the direct data forwarding is supported between the source node device and the destination node device.

In case C, the first message further includes an identifier of the destination node device, and the identifier is used by the source node device to determine whether the direct data forwarding is supported between the source node device and the destination node device. In S703a, the source node device determines, based on the identifier of the destination node device, whether the direct data forwarding is supported between the source node device and the destination node device. For a specific implementation of S703a, refer to the specific implementation of S501. Details are not described herein again.

Specifically, in case C, the source node device determines whether the direct data forwarding is supported between the source node device and the destination node device. If determining that the direct data forwarding is supported between the source node device and the destination node device, the source node device sends data to the destination node device based on the address for the direct data forwarding. If determining that the direct data forwarding is not supported between the source node device and the destination node device, the source node device forwards data to the destination node device based on the address for the indirect data forwarding.

According to the data sending method provided in this application, the first node device sends the address for the direct data forwarding and/or the address for the indirect data forwarding to the source node device by using the first message, so that the source node device selects to perform the direct data forwarding or the indirect data forwarding. In this way, if the direct data forwarding is performed between the source node device and the destination node device, an SN change does not need to be forwarded via the first node device, and performance of a network in which the first node device is located is not affected.

Further, as shown in FIG. 8, before S701, the data sending method provided in this embodiment of this application may further include S704.

S704. The first node device obtains an address for the direct data forwarding between the source node device and the destination node device.

It should be noted that an implementation process of S704 is the same as an implementation process of S507. For details, refer to specific implementation of S507. Details are not described herein again.

Further, if a device that forwards data to the destination node device is not the first node device, the data sending methods shown in FIG. 5 to FIG. 8 and provided in the embodiments of this application may further include: obtaining, by the first node device, an address for indirect data forwarding. The obtaining, by the first node device, an address for indirect data forwarding may be implemented as follows: sending, by the first node device, a request message to the device that forwards the data to the destination node device, to obtain the address for the indirect data forwarding between the source node device and the destination node device.

Optionally, corresponding to the implementation 2 or the implementation 3 in S701, as shown in FIG. 8, before S701, the data sending method provided in this embodiment of this application may further include S705.

S705. The first node device determines whether direct data forwarding is supported between the source node device and the destination node device.

Optionally, in a possible implementation, S705 may be specifically implemented as S7051 to S7055. Therefore, S705 in FIG. 8 may be completely replaced with S7051 to S7055.

S7051. The first node device sends a third message to the source node device, where the third message includes an identifier of the destination node device.

Optionally, the third message may be a configured dedicated message, or may be an existing interaction message between the source node device and the first node device. A type of the third message is not specifically limited in this embodiment of this application.

S7052. The source node device receives the third message sent by the first node device.

S7053. The source node device determines, based on the third message, whether direct data forwarding is supported between the source node device and the destination node device.

It should be noted that for specific implementation of S7053, refer to S501. Details are not described herein again.

S7054. The source node device sends a response message of the third message to the first node device, where the response message of the third message includes a first indication, and the first indication is used to indicate whether the direct data forwarding is supported between the source node device and the destination node device.

It should be noted that the first indication has been described in detail in S502, and details are not described herein again.

S7055. The first node device receives the response message of the third message from the source node device.

In S7055, the first node device may determine, based on the first indication that is in the response message of the third message, whether the direct data forwarding is supported between the source node device and the destination node device.

Optionally, in a possible implementation, S705 may be specifically implemented as S705a to S705e. Therefore, S705 in FIG. 8 may be completely replaced with S705a to S705e.

S705a. The first node device sends a fifth message to the destination node device, where the fifth message includes an identifier of the source node device.

Optionally, the fifth message may be a configured dedicated message, or may be an existing interaction message between the destination node device and the first node device. A type of the fifth message is not specifically limited in this embodiment of this application.

It should be noted that the fifth message and the foregoing second message may be a same message, or may be two different messages. This is not specifically limited in this embodiment of this application. For example, the fifth message may be a node addition request message in the node change procedure.

S705b. The destination node device receives the fifth message sent by the first node device.

S705c. The destination node device determines, based on the fifth message, whether direct data forwarding is supported between the source node device and the destination node device.

It should be noted that, for specific implementation of S705c, refer to S501, and an only difference is that S705c is performed by the destination node device. Details are not described herein again.

S705d. The destination node device sends a response message of the fifth message to the first node device, where the response message of the fifth message includes a first indication, and the first indication is used to indicate whether the direct data forwarding is supported between the source node device and the destination node device.

It should be noted that the first indication has been described in detail in S502, and details are not described herein again.

S705e. The first node device receives the response message of the fifth message from the destination node device.

In S705e, the first node device may determine, based on the first indication that is in the response message of the fifth message, whether the direct data forwarding is supported between the source node device and the destination node device.

Further, optionally, as shown in FIG. 8, after S703, the data sending method provided in this embodiment of this application may further include S706 and S707.

S706. The source node device sends a fourth message to the first node device, where the fourth message includes address indication information, and the address indication information is used to indicate an address selected by the source node device for data forwarding.

S707. The first node device receives the fourth message from the source node device.

Specifically, after S707, if the address indication information indicates that the indirect data forwarding is performed between the source node device and the destination node device, the first node device forwards, to the destination node, the data sent by the source node device; if the address indication information indicates that the direct data forwarding is performed between the source node device and the destination node device, the first node device ends waiting for the data of the source node device.

It should be noted that there is no limitation on an execution sequence of the steps of the data sending methods provided in the embodiments of this application. Each accompanying drawing in FIG. 5 to FIG. 8 shows only a possible procedure execution sequence, and does not limit the execution sequence of the steps.

The foregoing mainly describes the solutions provided in the embodiments of this application from the perspective of a working process of a node device in the dual connectivity network. It may be understood that, to implement the foregoing functions, the node device (the source node device, the first node device, or the destination node device) include corresponding hardware structures and/or software modules for performing the functions. Persons skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

It should be noted that a function part of the node device that performs the data sending method provided in this application is referred to as a data sending apparatus. It may be understood that the data sending apparatus may be a part or all of the node device. To be specific, the data sending apparatus may be equivalent to the node device, or the data sending apparatus may be deployed in the node device, to support the node device in performing the data sending method provided in this application.

In the embodiments of this application, the source node device and the first node device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, module division is an example, and is merely a logical function division. In actual implementation, another division manner may be used. When the data sending apparatus is a part or all of the source node device or the first node device, dividing the source node device or the first node device into the function modules is equivalent to dividing the data sending apparatus into function modules. Alternatively, when the data sending apparatus is a part or all of the source node device or the first node device, dividing the data sending apparatus into function modules is equivalent to dividing the source node device or the first node device into the function modules.

Figure 9:
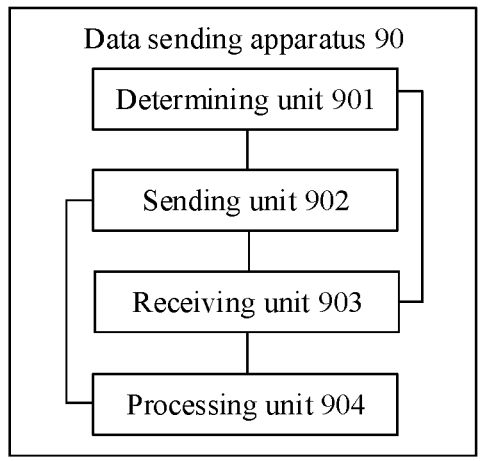
FIG. 9 is a schematic structural diagram of another source node device according to an embodiment of this application.

When each function module is obtained through division based on each corresponding function, FIG. 9 is a possible schematic structural diagram of a data sending apparatus in the source node device in the foregoing embodiments. A data sending apparatus 90 may include a determining unit 901, a sending unit 902, a receiving unit 903, and a processing unit 904. The determining unit 901 is configured to perform the process S501 in FIG. 5 or FIG. 6. The sending unit 902 is configured to perform the process S502 in FIG. 5 or FIG. 6. The receiving unit 903 is configured to perform the process S505 in FIG. 5 or FIG. 6. The processing unit 904 is configured to perform the process S506 in FIG. 5 or FIG. 6. All related content of the steps in the foregoing method embodiments may be cited in function descriptions of corresponding function modules. Details are not described herein again.

Figure 10:
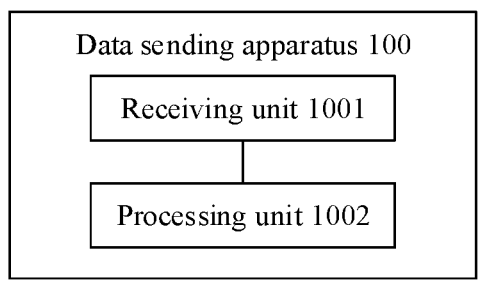
FIG. 10 is a schematic structural diagram of still another source node device according to an embodiment of this application.

When each function module is obtained through division based on each corresponding function, FIG. 10 is another possible schematic structural diagram of a data sending apparatus in the source node device in the foregoing embodiments. A data sending apparatus 100 may include a receiving unit 1001 and a processing unit 1002. The receiving unit 1001 is configured to perform the process S702 in FIG. 7 or FIG. 8. The processing unit 1002 is configured to perform the process S703 in FIG. 7 or FIG. 8. All related content of the steps in the foregoing method embodiments may be cited in function descriptions of corresponding function modules. Details are not described herein again.

Figure 11:
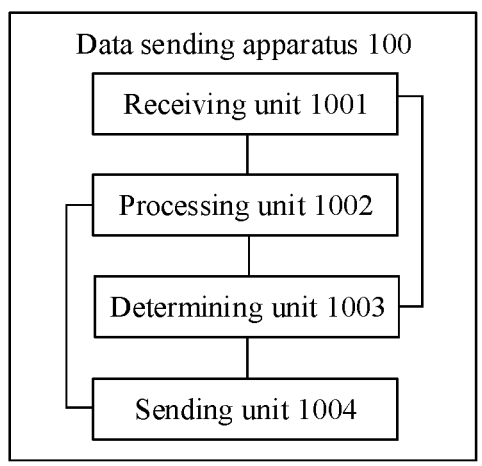
FIG. 11 is a schematic structural diagram of yet another source node device according to an embodiment of this application.

Further, as shown in FIG. 11, the data sending apparatus 100 may further include a determining unit 1003 and a sending unit 1004. The determining unit 1003 is configured to perform the process S703a in FIG. 8. The sending unit 1004 is configured to perform the process S706 in FIG. 8.

Figure 12:
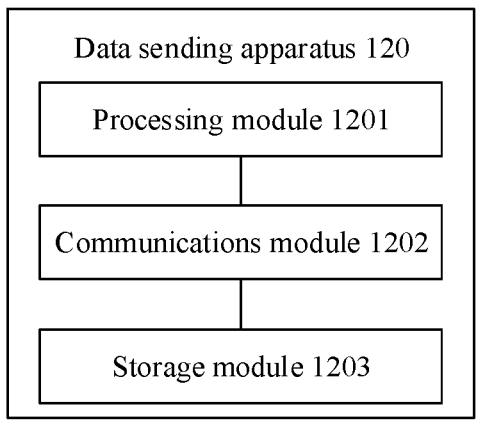
FIG. 12 is a schematic structural diagram of yet another source node device according to an embodiment of this application.

When the integrated unit is used, FIG. 12 is a possible schematic structural diagram of a data sending apparatus in the source node device in the foregoing embodiments. A data sending apparatus 120 may include a processing module 1201 and a communications module 1202. The processing module 1201 is configured to control and manage an action of the data sending apparatus 120. For example, the processing module 1201 is configured to support the data sending apparatus 120 in performing the processes S501 and S506 in FIG. 5 or FIG. 6, and the processes S703 and S703a in FIG. 7 or FIG. 8. The processing module 1201 supports, via the communications module 1202, the data sending apparatus 120 in performing the processes S502 and S505 in FIG. 5 or FIG. 6, and the processes S702 and S706 in FIG. 7 or FIG. 8. The data sending apparatus 120 may further include a storage module 1203, configured to store program code and data of the data sending apparatus 120.

When the data sending apparatus 120 is deployed in the source node device, the processing module 1201 may be the processor 201 in an entity structure of the source node device 20 shown in FIG. 2, and may be a processor or a controller, for example, may be a CPU, a general-purpose processor, a DSP, an ASIC, an FPGA or another programmable logic device, a transistor logic device, a hardware component, or any combination thereof. The processing module 1201 may implement or execute various example logical blocks, modules, and circuits described with reference to content disclosed in this application. Alternatively, the processing module 1201 may be a combination of processors implementing a computing function, for example, a combination of one or more microprocessors, or a combination of the DSP and a microprocessor. The communications module 1202 may be the transceiver 203 in the entity structure of the source node device 20 shown in FIG. 2. The communications module 1202 may be a communications port, or may be a transceiver, a transceiver circuit, a communications interface, or the like. Alternatively, the communications interface may communicate with another device via the foregoing element that has receiving and sending functions. The foregoing element that has receiving and sending functions may be implemented via an antenna and/or a radio frequency apparatus. The storage module 1203 may be the memory 202 in an entity structure of the source node device 20 shown in FIG. 2.

When the processing module 1201 is the processor, the communications module 1202 is the transceiver, and the storage module 1203 is the memory, the data sending apparatus 120 in FIG. 12 in this embodiment of this application may be a part or all of the source node device 20 shown in FIG. 2.

As described above, the data sending apparatus 90, the data sending apparatus 100, or the data sending apparatus 120 provided in this embodiment of this application may be configured to implement functions of the source node device that is in the methods implemented in the foregoing embodiments of this application. For ease of description, only a part related to this embodiment of this application is shown, for specific technical details that are not disclosed, refer to the embodiments of this application.

Figure 13:
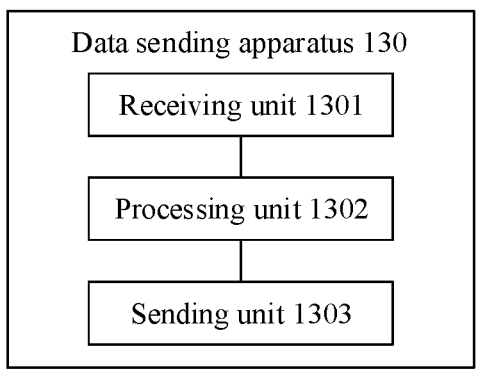
FIG. 13 is a schematic structural diagram of another first node device according to an embodiment of this application.

When each function module is obtained through division based on each corresponding function, FIG. 13 is a possible schematic structural diagram of a data sending apparatus in the first node device in the foregoing embodiments. A data sending apparatus 130 may include a receiving unit 1301, a processing unit 1302, and a sending unit 1303. The receiving unit 1301 is configured to perform the process S503 in FIG. 5 or FIG. 6. The processing unit 1302 is configured to perform the process S507 in FIG. 6. The sending unit 1303 is configured to perform the process S504 in FIG. 5 or FIG. 6. All related content of the steps in the foregoing method embodiments may be cited in function descriptions of corresponding function modules. Details are not described herein again.

Figure 14:
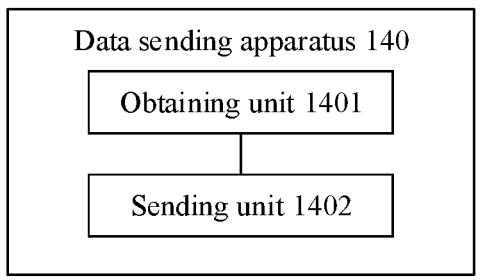
FIG. 14 is a schematic structural diagram of still another first node device according to an embodiment of this application.

When each function module is obtained through division based on each corresponding function, FIG. 14 is another possible schematic structural diagram of a data sending apparatus in the first node device in the foregoing embodiments. A data sending apparatus 140 may include an obtaining unit 1401 and a sending unit 1402. The obtaining unit 1401 is configured to perform the process S704 in FIG. 8. The sending unit 1402 is configured to perform the process S701 in FIG. 7 or FIG. 8. All related content of the steps in the foregoing method embodiments may be cited in function descriptions of corresponding function modules. Details are not described herein again.

Figure 15:
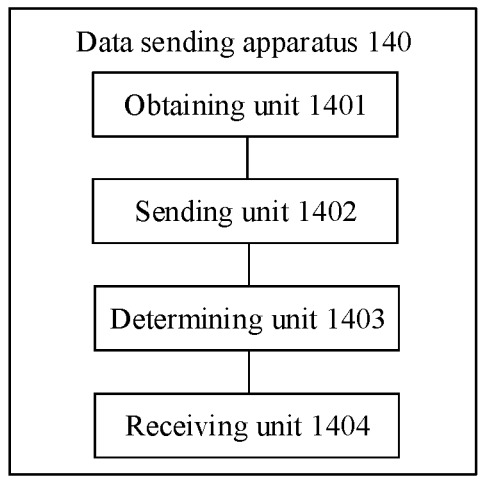
FIG. 15 is a schematic structural diagram of yet another first node device according to an embodiment of this application.

Further, as shown in FIG. 15, the data sending apparatus 140 may further include a determining unit 1403 and a receiving unit 1404. The determining unit 1403 is configured to perform the process S705 in FIG. 8. The receiving unit 1404 is configured to perform the process S707 in FIG. 8.

Figure 16:
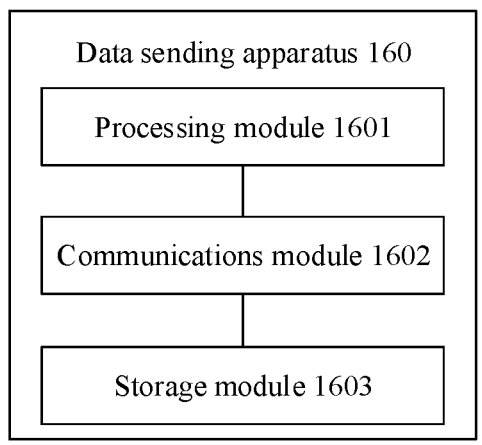
FIG. 16 is a schematic structural diagram of yet another first node device according to an embodiment of this application.

When the integrated unit is used, FIG. 16 is a possible schematic structural diagram of a data sending apparatus in the first node device in the foregoing embodiments. A data sending apparatus 160 may include a processing module 1601 and a communications module 1602. The processing module 1601 is configured to control and manage an action of the data sending apparatus 160. For example, the processing module 1601 is configured to support the data sending apparatus 160 in performing the process S507 in FIG. 6, and the processes S704 and S705 in FIG. 8. The processing module 1601 supports, via the communications module 1602, the data sending apparatus 160 in performing the processes S503 and S504 in FIG. 5 or FIG. 6, and the processes S701 and S707 in FIG. 7 or FIG. 8. The data sending apparatus 160 may further include a storage module 1603, configured to store program code and data of the data sending apparatus 160.

When the data sending apparatus 160 is deployed in the first node device, the processing module 1601 may be the processor 301 in an entity structure of the first node device 30 shown in FIG. 3, and may be a processor or a controller, for example, may be a CPU, a general-purpose processor, a DSP, an ASIC, an FPGA or another programmable logic device, a transistor logic device, a hardware component, or any combination thereof. The processing module 1601 may implement or execute various example logical blocks, modules, and circuits described with reference to content disclosed in this application. Alternatively, the processing module 1601 may be a combination of processors implementing a computing function, for example, a combination of one or more microprocessors, or a combination of the DSP and a microprocessor. The communications module 1602 may be the transceiver 303 in the entity structure of the first node device 30 shown in FIG. 3. The communications module 1602 may be a communications port, or may be a transceiver, a transceiver circuit, a communications interface, or the like. Alternatively, the communications interface may communicate with another device via the foregoing element that has receiving and sending functions. The foregoing element that has receiving and sending functions may be implemented via an antenna and/or a radio frequency apparatus. The storage module 1603 may be the memory 302 in the entity structure of the first node device 30 shown in FIG. 3.

When the processing module 1601 is the processor, the communications module 1602 is the transceiver, and the storage module 1603 is the memory, the data sending apparatus 160 in FIG. 16 in this embodiment of this application may be a part or all of the first node device 30 shown in FIG. 3.

As described above, the data sending apparatus 130, the data sending apparatus 140, or the data sending apparatus 160 provided in this embodiment of this application may be configured to implement functions of the source node device that is in the methods implemented in the foregoing embodiments of this application. For ease of description, only a part related to this embodiment of this application is shown, for specific technical details that are not disclosed, refer to the embodiments of this application.

Figure 17:
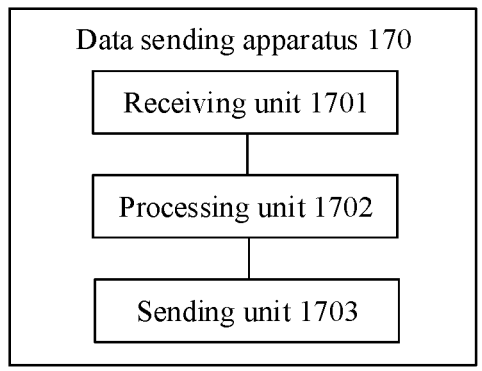
FIG. 17 is a schematic structural diagram of another destination node device according to an embodiment of this application.

When each function module is obtained through division based on each corresponding function, FIG. 17 is a possible schematic structural diagram of a data sending apparatus in the destination node device in the foregoing embodiments. A data sending apparatus 170 may include a receiving unit 1701, a processing unit 1702, and a sending unit 1703. The receiving unit 1701 is configured to receive a message sent by a first node device. The processing unit 1702 is configured to determine whether direct data forwarding is supported between the data sending apparatus 170 and a source node device. The sending unit 1703 is configured to send a response message to the first node device, where the response message includes an address for the direct data forwarding, or the first indication. All related content of the steps in the foregoing method embodiments may be cited in function descriptions of corresponding function modules. Details are not described herein again.

Figure 18:
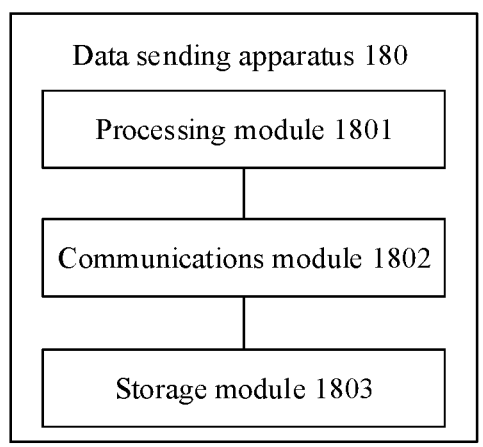
FIG. 18 is a schematic structural diagram of still another destination node device according to an embodiment of this application.

When the integrated unit is used, FIG. 18 is a possible schematic structural diagram of a data sending apparatus in the destination node device in the foregoing embodiments. A data sending apparatus 180 may include a processing module 1801 and a communications module 1802. The processing module 1801 is configured to control and manage an action of the data sending apparatus 180. For example, the processing module 1801 is configured to support the data sending apparatus 180 in determining whether direct data forwarding is supported between the data sending apparatus 180 and a source node device. The processing module 1801 supports, via the communications module 1802, the data sending apparatus 180 in receiving and sending messages. The data sending apparatus 180 may further include a storage module 1803, configured to store program code and data of the data sending apparatus 180.

When the data sending apparatus 180 is deployed in the destination node device, the processing module 1801 may be the processor 401 in an entity structure of the destination node device 40 shown in FIG. 4, and may be a processor or a controller, for example, may be a CPU, a general-purpose processor, a DSP, an ASIC, an FPGA or another programmable logic device, a transistor logic device, a hardware component, or any combination thereof. The processing module 1801 may implement or execute various example logical blocks, modules, and circuits described with reference to content disclosed in this application. Alternatively, the processing module 1801 may be a combination of processors implementing a computing function, for example, a combination of one or more microprocessors, or a combination of the DSP and a microprocessor. The communications module 1802 may be the transceiver 403 in the entity structure of the destination node device 40 shown in FIG. 4. The communications module 1802 may be a communications port, or may be a transceiver, a transceiver circuit, a communications interface, or the like. Alternatively, the communications interface may communicate with another device via the foregoing element that has receiving and sending functions. The foregoing element that has receiving and sending functions may be implemented via an antenna and/or a radio frequency apparatus. The storage module 1803 may be the memory 302 in the entity structure of the destination node device 40 shown in FIG. 4.

When the processing module 1801 is the processor, the communications module 1802 is the transceiver, and the storage module 1803 is the memory, the data sending apparatus 180 in FIG. 18 in this embodiment of this application may be a part or all of the destination node device 40 shown in FIG. 4.

As described above, the data sending apparatus 170 or the data sending apparatus 180 provided in this embodiment of this application may be configured to implement functions of the destination node device that is in the methods implemented in the foregoing embodiments of this application. For ease of description, only a part related to this embodiment of this application is shown, for specific technical details that are not disclosed, refer to the embodiments of this application.

According to still another aspect, an embodiment of this application provides a data sending system, including the source node device described in the foregoing embodiments and the first node device described in the foregoing embodiments.

Method or algorithm steps described with reference to content disclosed in this application may be implemented by hardware, or may be implemented by a processor by executing a software instruction. The software instruction may include a corresponding software module. The software module may be stored in a RAM, a flash memory, a ROM, an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, the storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components. Alternatively, the memory may be coupled to the processor. For example, the memory may exist independently, and is connected to the processor by using a bus. The memory may be integrated with the processor. The memory may be configured to store application program code for executing the technical solutions provided in the embodiments of this application, and the processor controls the execution. The processor is configured to execute application program code stored in the memory, to implement the technical solutions provided in the embodiments of this application.

An embodiment of this application further provides a chip system. The chip system includes a processor, configured to implement the technical methods of a communications device that are in the embodiments of the present invention. In a possible design, the chip system further includes a memory, configured to store a program instruction and/or data that are/is necessary for the communications device in this embodiment of the present invention. In a possible design, the chip system further includes a memory, configured for the processor to invoke application program code stored in the memory. The chip system may include one or more chips, or may include a chip and another discrete device. This is not specifically limited in this embodiment of this application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

Persons skilled in the art should be aware that in the foregoing one or more examples, functions described in this application may be implemented by hardware, software, firmware, or any combination thereof. When implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general purpose or dedicated computer. It may be clearly understood by persons skilled in the art that, for the purpose of convenient and brief description, for the detailed working process of the foregoing system, apparatus, and unit, refer to the corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

The foregoing integrated unit is implemented in a form of a software function unit, and may be stored in a computer-readable storage medium. The software function unit is stored in a storage medium and includes several instructions for enabling a computer device (which may be a personal computer, a server, a network device, or the like) to perform some of the steps of the methods described in the embodiments of this application. The foregoing storage medium includes: any medium that can store program code, for example, a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data sending method, comprising:
  determining, by a source node device, whether direct data forwarding is supported between the source node device and a destination node device, wherein
    the source node device determines whether the direct data forwarding is supported between the source node device and the destination node device by querying, based on an identifier of the destination node device, data for determining if the data includes the identifier of the destination node device;
  sending, by the source node device, a first message to a first node device, wherein
    the first message comprises a first indication and the identifier of the destination node device, and
    the first indication indicates whether the direct data forwarding is supported between the source node device and the destination node device;
  receiving, by the source node device, a response message of the first message from the first node device, wherein
    the response message of the first message comprises an address for the direct data forwarding between the source node device and the destination node device, or
    the response message of the first message comprises an address for indirect data forwarding between the source node device and the destination node device; and
  directly sending, by the source node device, data to the destination node device based on the address for the direct data forwarding, or forwarding, by the source node device, the data to the destination node device based on the address for the indirect data forwarding.

2. The data sending method according to claim 1, wherein the first message comprises a node change request message.

3. A data sending method, comprising:
  sending, by a first node device, a first message to a source node device, wherein
    the first message comprises at least one of: an address for direct data forwarding between the source node device and a destination node device, or an address for indirect data forwarding between the source node device and the destination node device, and the first message comprises the address for the direct data forwarding between the source node device and the destination node device based on a determination of the source node device as to whether the direct data forwarding is supported between the source node device and the destination node device, wherein the determination is made by querying, based on an identifier of the destination node device, data for determining if the data includes the identifier of the destination node device.

4. The data sending method according to claim 3, further comprising:
obtaining, by the first node device, the address for the direct data forwarding between the source node device and the destination node device.

5. The data sending method according to claim 3, wherein obtaining, by the first node device, the address for the direct data forwarding between the source node device and the destination node device comprises:
sending, by the first node device, a second message to the destination node device, wherein the second message comprises an identifier of the source node device; and
receiving, by the first node device, a response message of the second message from the destination node device, wherein the response message of the second message comprises the address for the direct data forwarding between the source node device and the destination node device.

6. The data sending method according to claim 3, further comprising:
determining, by the first node device, whether the direct data forwarding is supported between the source node device and the destination node device.

7. The data sending method according to claim 6, wherein determining, by the first node device, whether the direct data forwarding is supported between the source node device and the destination node device comprises:
sending, by the first node device, a third message to the source node device, wherein the third message comprises an identifier of the destination node device; and
receiving, by the first node device, a response message of the third message from the source node device, wherein the response message of the third message comprises a first indication, and the first indication indicates whether the direct data forwarding is supported between the source node device and the destination node device.

8. The data sending method according to claim 3, further comprising:
receiving, by the first node device, a fourth message from the source node device, wherein the fourth message comprises address indication information, and the address indication information indicates an address selected by the source node device for data forwarding.

9. The data sending method according to claim 3, wherein the first message comprises a node release request message.

10. The data sending method according to claim 5, wherein the second message comprises a node addition request message.

11. A data sending method, comprising:
receiving, by a source node device, a first message from a first node device, wherein
the first message comprises at least one of: an address for direct data forwarding between the source node device and a destination node device, or an address for indirect data forwarding between the source node device and the destination node device, and
the first message comprises the address for the direct data forwarding between the source node device and the destination node device based on a determination of the source node device as to whether the direct data forwarding is supported between the source node device and the destination node device, wherein the determination is made by querying, based on an identifier of the destination node device, data for determining if the data includes the identifier of the destination node device; and
directly sending, by the source node device, data to the destination node device based on the address for the direct data forwarding, or forwarding, by the source node device, the data to the destination node device based on the address for the indirect data forwarding.

12. The data sending method according to claim 11, wherein the first message further comprises the identifier of the destination node device.

13. The data sending method according to claim 11, further comprising:
receiving, by the source node device, a third message from the first node device, wherein the third message comprises an identifier of the destination node device;
determining, by the source node device based on the identifier of the destination node device, whether the direct data forwarding is supported between the source node device and the destination node device; and
sending, by the source node device, a response message of the third message to the first node device, wherein the response message of the third message comprises a first indication, and the first indication indicates whether the direct data forwarding is supported between the source node device and the destination node device.

14. The data sending method according to claim 11, further comprising:
sending, by the source node device, a fourth message to the first node device, wherein the fourth message comprises address indication information, and the address indication information indicates an address selected by the source node device for data forwarding.

15. The data sending method according to claim 11, wherein the first message comprises a node release request message.

16. The data sending method according to claim 1, wherein determining whether the direct data forwarding is supported between the source node device and the destination node device includes:
sending, by the source node device, a test message to the destination device based on the identifier of the destination device; and
based on whether a response message of the test message is received within a specified duration, determining, by the source node device, whether the direct data forwarding is supported between the source node device and the destination node device.

17. The data sending method according to claim 3, wherein
the source node device is configured to send a test message to the destination device based on the identifier of the destination device, and
the determination of the source node device as to whether the direct data forwarding is supported is made based on whether a response message of the test message is received within a specified duration.

18. The data sending method according to claim 11, wherein the source node device is configured to send a test message to the destination device based on the identifier of the destination device, and the determination of the source node device as to whether the direct data forwarding is supported is made based on whether a response message of the test message is received within a specified duration.

\* \* \* \* \*